United States Patent [19]
Ueda

[11] Patent Number: 5,247,241
[45] Date of Patent: Sep. 21, 1993

[54] FREQUENCY AND CAPACITOR BASED CONSTANT CURRENT SOURCE

[75] Inventor: Shunsaku Ueda, Carlsbad, Calif.

[73] Assignee: Silicon Systems, Inc., Tustin, Calif.

[21] Appl. No.: 780,153

[22] Filed: Oct. 21, 1991

[51] Int. Cl.[5] .............................................. G05F 3/16
[52] U.S. Cl. .................................. 323/312; 307/597; 307/603; 328/155; 331/1 A; 331/17; 331/DIG. 2
[58] Field of Search ............... 323/312, 313, 315, 316, 323/317; 307/491, 510, 590, 592, 594, 597, 600, 603, 605; 328/171, 172, 209, 155; 331/1 A, 17, DIG. 2

[56] References Cited
U.S. PATENT DOCUMENTS

| | | | |
|---|---|---|---|
| 4,633,164 | 12/1986 | Kaiser | 323/312 |
| 5,059,838 | 10/1991 | Motegi et al. | 307/603 |
| 5,144,156 | 9/1992 | Kawasaki | 328/155 X |

Primary Examiner—Emanuel T. Voeltz
Attorney, Agent, or Firm—Hecker & Harriman

[57] ABSTRACT

The present invention is a constant current source whose magnitude is proportional to capacitor values, reference voltage and input frequency. A frequency divider provides a plurality of signals to one of a plurality of capacitor switches located within a charge generator. The outputs of the capacitor switches are combined to provide a known charge $Q_i$ to an output generator at regular intervals, $t_0 = 1/F_{in}$. The output generator produces an output current $I_{out} = Q_i/t_0 = C_i \ast V_{bg} \ast F_{in}$, where $C_i$ is a capacitor value, $V_{bg}$ is a reference voltage, and $F_{in}$ is the input frequency. A controller provides a control signal to the output generator to limit variations in the output current $I_{out}$. The preferred embodiment may be used in conjunction with process invariant circuits in a variety of semiconductor technologies: CMOS, Bipolar, BiCMOS and GAS. In one embodiment, the present invention is used in conjuction with a timer/delay circuit. In another embodiment, the present invention is used in conjunction with a calibration circuit to compensate for various inaccuracies in component performance.

49 Claims, 14 Drawing Sheets

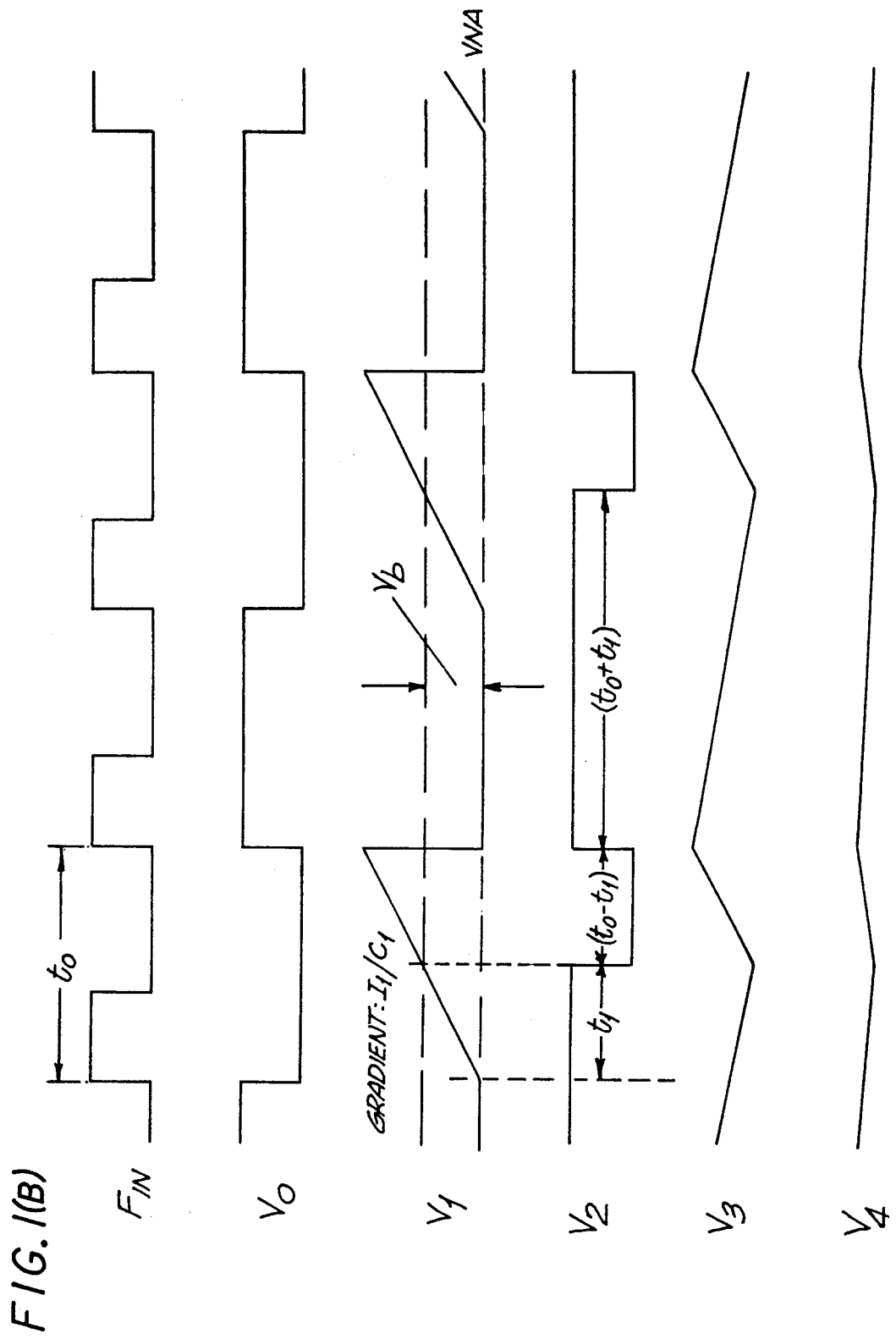

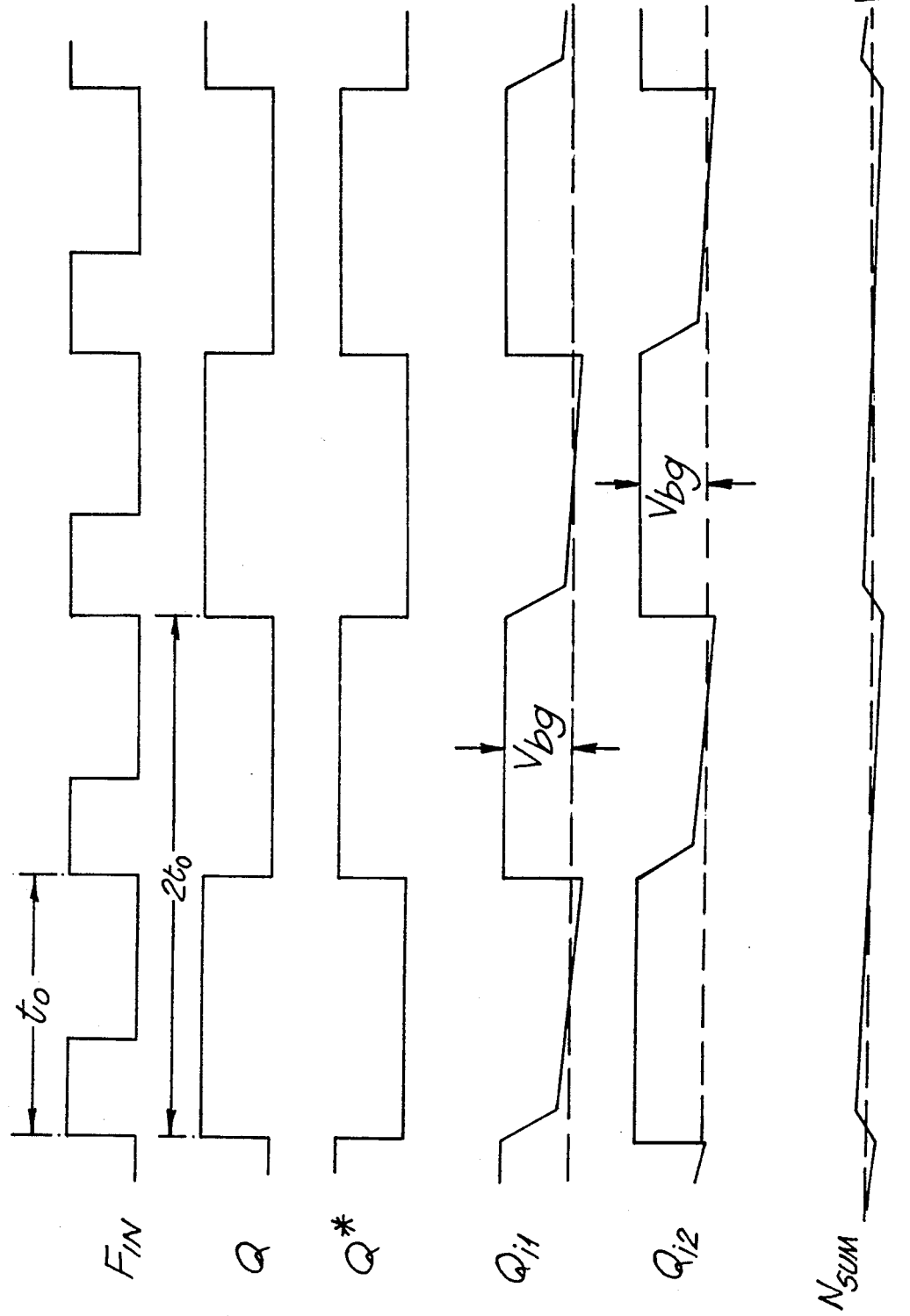

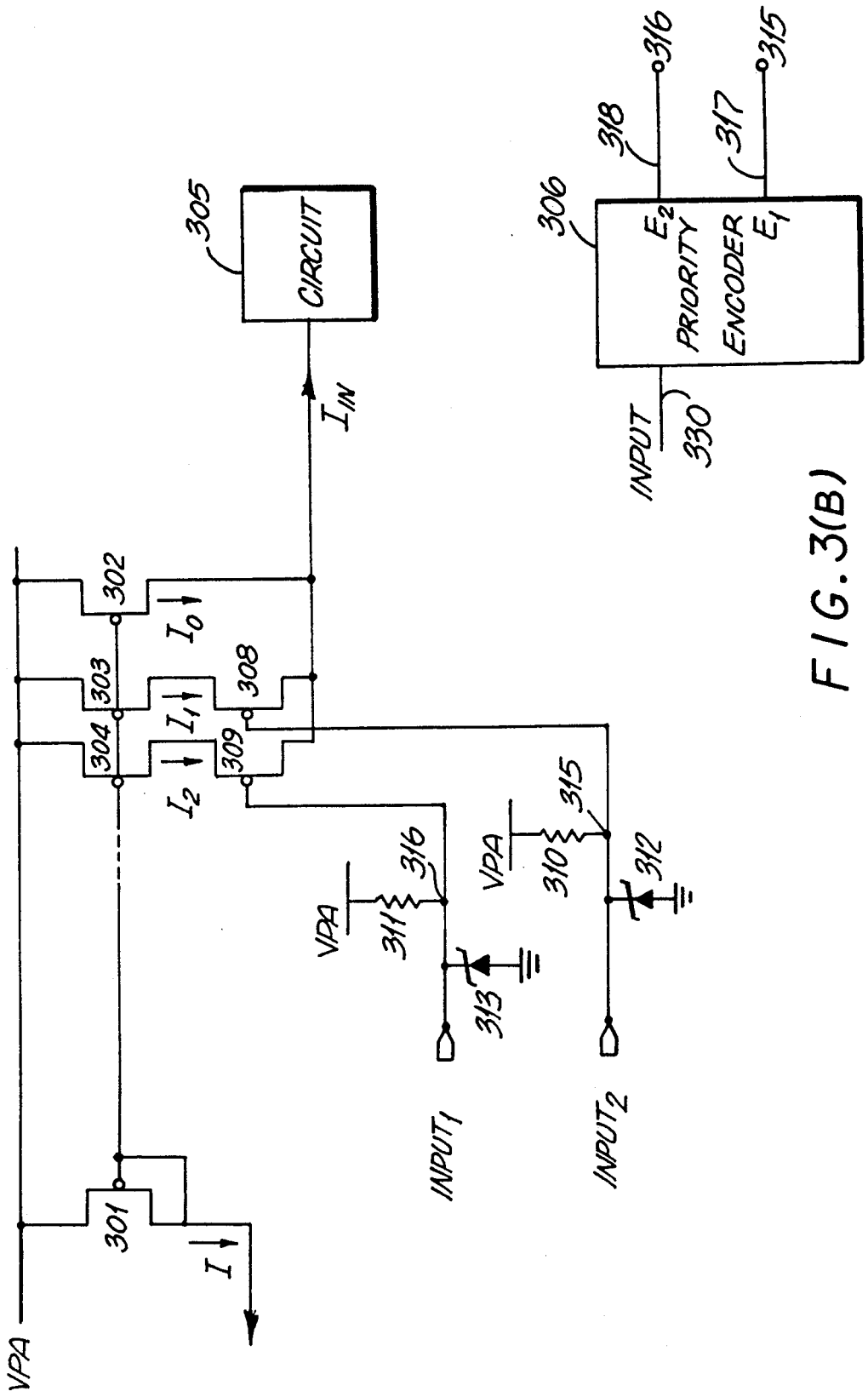

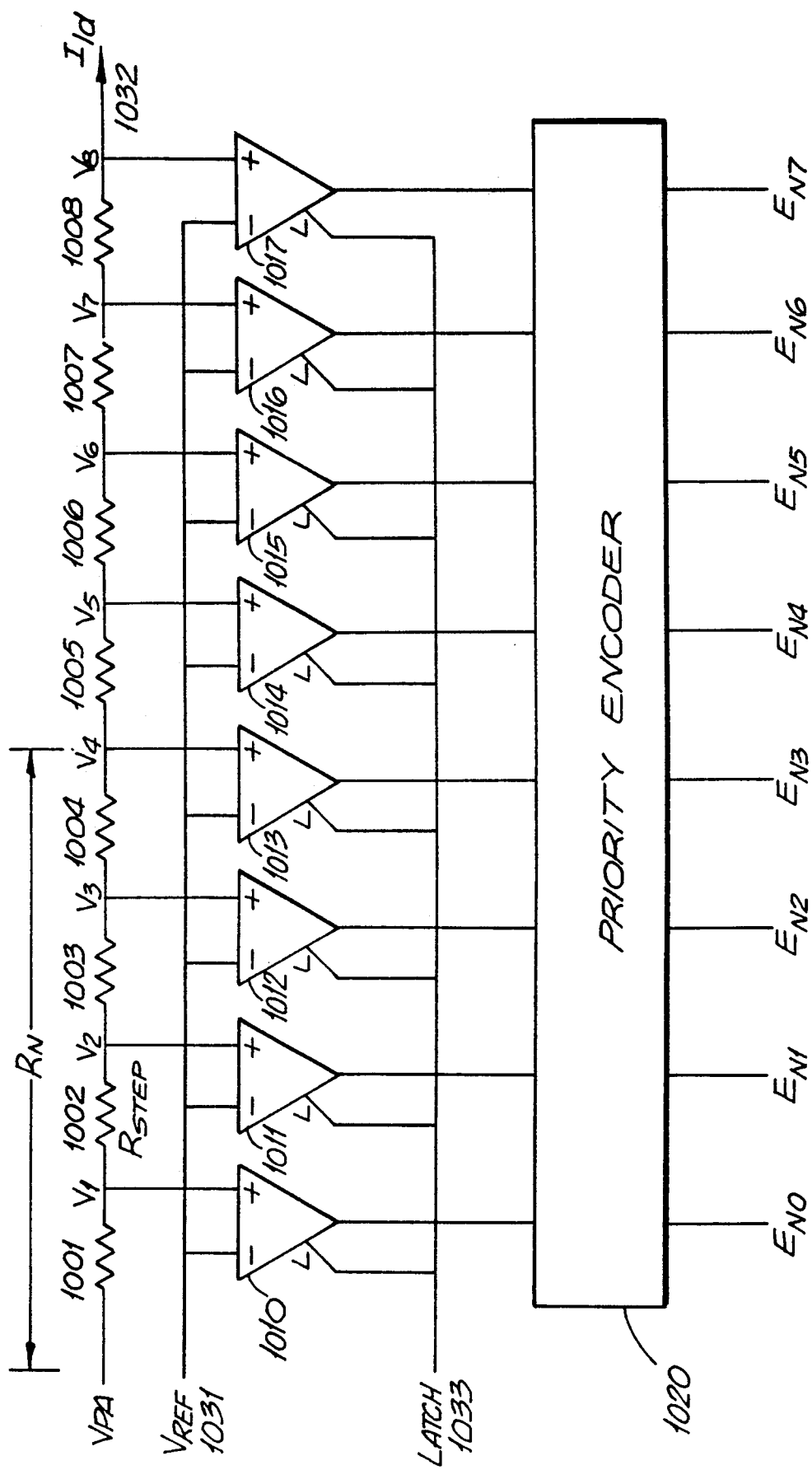

FREQUENCY AND CAPACITOR BASED CONSTANT CURRENT SOURCE

BACKGROUND OF THE INVENTION

1. Field of the Invention

The present invention relates to the field of current sources and, in particular, to a constant current source whose magnitude is proportional to capacitor ratios, reference voltage and switching frequency.

2. Background Art

Semiconductor circuits are comprised of a number of different elements, such as resistors, transistors, capacitors, etc. The operation of a semiconductor circuit often depends on the interaction of one or more of these elements. For proper interaction, the relative values of the interdependent elements must be within a desired range. Such a semiconductor circuit is known as a "process dependent" circuit. However, the nature of semiconductor circuit manufacturing is such that there is often variation in the actual values of circuit elements. If the actual values vary too greatly, the desired relative relationship between the elements may be such that the operation of the semiconductor circuit is compromised. This is referred to as "process mismatching".

It is desirable to construct semiconductor circuits whose operation is substantially independent from the values of any of its components. Such circuits are called "process invariant" circuits. A process invariant circuit is one whose operation is insulated from the unpredictable variations in component values and performance that may occur during normal manufacturing processes and operation.

One component often used in process invariant circuits is a current source. Prior art capacitor based current sources are discussed in detail below, along with their drawbacks. One application of prior art current sources is in a timer/delay circuit. The disadvantages of prior art current sources limit the performance of such timer/delay circuits. These performance limitations are described in detail below.

Prior art trim/compensation circuits are also discussed. To date, there are no adequate integral trim/compensation schemes for use in CMOS based circuits.

Many prior art current sources are resistor based. In other words, the output current is proportional to the value of one or more resistors in the current source. If the resistor based current source is used in a circuit that also is resistor based, then the non-linear effects of variations in the resistors' sizes and performance can often be "cancelled out" resulting in a process invariant circuit.

However, many different process invariant circuits are capacitor based, such as frequency tracking loop filters, charge pumps, process invariant PLL architecture and process invariant delay timers. Those circuits that are capacitor based (by design or through parasitic capacitance) cannot use a resistor based current source if process invariance is desired. To maintain process invariance, a capacitor based current source must be used.

In a typical capacitor based current source, the magnitude of the output current is proportional to (among other things) the values of the capacitors in the current source. A prior art capacitor based current source is presented in Kozaburo Kurita and Takashi Hotta, "PLL-Based BiCMOS On-Chip Clock Generator for Very High Speed Microprocessor," Journal of Solid State Circuits 26.4 (April 1991): 586.

A block diagram of this prior art capacitor based current source is illustrated in FIG. 4(A). This current source uses pulse width modulation and low pass filtering to generate output current $I_1$. Frequency divider 401 receives input signal $F_{in}$ and produces a single output $V_0$. Output $V_0$ is an oscillating signal, and is fed into integrator 402. Integrator 402 integrates output $V_0$, producing ramp signal $V_1$ and providing $V_1$ to comparator 403. Comparator 403 compares ramp signal $V_1$ to reference 404, providing a pulse width modulated (PWM) signal $V_2$ to charge pump 405. Charge pump 405 charges and discharges an internal capacitor at a rate governed by the PWM signal $V_2$, producing voltage $V_3$. Voltage $V_3$ approximates a DC signal, but contains some unwanted AC components, so it is fed into filter 406. Filter 406 removes some of the AC components from signal $V_3$ and provides output current $I_1$. This output current is also provided to integrator 402 via feedback loop 407.

A circuit diagram of this prior art capacitor based current source is illustrated in FIG. 1(A). Clock input $F_{in}$ is coupled to frequency divider 401. Frequency divider 401 divides the frequency of clock input $F_{in}$ by two to generate a 50% duty cycle clock output at node 101. This 50% duty cycle clock signal is provided to integrator 402 at node 101. The voltage at node 101 is $V_0$.

Integrator 402 is now described. Integrator 402 consists generally of transistors 103–104 and capacitor $C_1$. Node 101 is coupled to the gates of PMOS transistor 103 and NMOS transistor 104. The source of transistor 104 is coupled to voltage source VNA. The drain of transistor 104 is coupled to node 106. The drain of transistor 103 is also coupled to node 106, and the source of transistor 103 is coupled to the drain of transistor 105. The source of transistor 105 is coupled to voltage source VPA. One terminal of capacitor $C_1$ is coupled to voltage source VNA, and the other terminal is coupled to node 106. The voltage at node 106 is $V_1$.

Voltage $V_1$ is connected to the inverting input of comparator 403. The non-inverting input of comparator 403 is coupled to reference voltage $V_b$. The output of comparator 403 is fed into charge pump 405 at node 120. The voltage at node 120 is $V_2$.

Charge pump 405 is now described. Charge pump 405 is generally comprised of transistors 110 and 111, current sources $I_3$ and $I_4$, and capacitor 112. Node 120 is coupled to the gates of PMOS transistor 110 and NMOS transistor 111. The source of transistor 111 is coupled to voltage source VNA through current source $I_4$. The drain of transistor 111 is coupled to the drain of transistor 110 at node 125. The source of transistor 110 is coupled to voltage source VPA through current source $I_3$. The voltage at node 125 is $V_3$. The first terminal of capacitor 112 is coupled to node 125 and the second terminal is coupled to voltage source VNA. The output of charge pump 405 is fed into low pass filter 406 at node 125. The voltage at node 130 is $V_4$.

Low pass filter 406 consists of resistor 113 and capacitor 114. The first terminal of resistor 113 is coupled to node 125, and the second terminal of resistor 113 is coupled to voltage source VNA through capacitor 114, and to the gates of PMOS transistors 105 and 115. The source of transistor 115 is coupled to voltage source VPA. Output current $I_1$ of the prior art current source is taken from the drain of transistor 115. Transistors 105 and 115 form a current mirror so that the current $I_1'$ flowing through transistor 105 is equal to output current $I_1$ flowing through transistor 115.

The waveforms of the current source of FIG. 1(A) are illustrated in FIG. 1(B). During the first half period of the 50% duty cycle clock signal, voltage $V_0$ is low, so NMOS transistor 104 is non-conducting ("turned-off") and PMOS transistor 103 is conducting ("turned-on"). Capacitor $C_1$ is charged by current $I_1'$, which originates at the drain of transistor 105 and is equal to output current $I_1$. Current $I_1'$ charges up capacitor $C_1$, causing voltage $V_1$ to ramp up. Comparator 403 compares capacitor voltage $V_1$ to reference bias voltage $V_b$ and outputs a pulse width modulated (PWM) signal at node 120 (voltage $V_2$) when voltage $V_1$ exceeds reference voltage $V_b$. The PWM signal drives charge pump 405. The charge pump circuit is controlled by voltage $V_2$ at node 120, and charges capacitor 112 by the "pump-up" current $I_3$ while the PWM signal is generated. The output voltage $V_3$ of charge pump 405 is smoothed by low pass filter 406, comprised of resistor 113 and capacitor 114, to produce output voltage $V_4$.

Output voltage $V_4$ of low pass filter 406 controls output current $I_1$ of transistor 115. Voltage $V_4$ also controls the charging current of integrator 402 by controlling the gate voltage of PMOS transistor 105. During the second half period of the 50% duty cycle clock signal, voltage $V_0$ is high, so transistor 103 is turned off and transistor 104 is turned on. This allows capacitor $C_1$ to discharge rapidly. Voltage $V_1$ drops below reference voltage $V_b$ and $V_2$ at the output of comparator 403 goes from low to high. Transistor 110 turns off and transistor 111 turns on, discharging capacitor 112 by the "pump-down" current $I_4$ and resetting the circuit for the start of the next clock period.

The steady state condition at node 125 is defined by:

Charge accumulated in capacitor 112 = charge discharged by capacitor 112

$$(t_0 - t_1)^*I_3 = (t_0 + t_1)^*I_4$$

$$(t_0^*I_3) - (t_1^*I_3) = (t_0^*I_4) + (t_1^*I_4)$$

$$t_1^*(I_3 + I_4) = t_0^*(I_3 - I_4)$$

$$t_1 = t_0^*(I_3 - I_4)/(I_3 + I_4)$$

where $$t_0 = 1/F_{in}$$

From FIGS. 1(A) and 1(B), it follows that the charge $Q_1$ present at node $V_1$ at the end of time period $t_1$ is $$Q_1 = t_1^*I_1 = V_b^*C_1$$

so that output current $I_1$ of the prior art current source is given by $$\begin{aligned}I_1 &= V_b * C_1/t_1 \\ &= V_b * C_1/(t_0 * (I_3 - I_4)/(I_3 + I_4)) \\ &= V_b * C_1 * F_{in} * (I_3 + I_4)/(I_3 - I_4)\end{aligned}$$

Output current $I_1$ of the prior art capacitor base current source is proportional to the bias voltage $V_b$, the value of capacitor $C_1$, and the input frequency $F_{in}$.

There are several disadvantages associated with the prior art current source. First, as in many PWM schemes, generating a PWM pulse requires comparator 403 to be a high speed comparator (on the order of 200 MHz). Comparator 403 must have equal rise and fall times, and equal delay and storage times. The rise/fall and delay/storage times of comparator 403 influence the effective $t_0$ and $t_1$ of the current source. If comparator 403 is not high speed, $t_0$ and $t_1$ will be skewed, and the PWM scheme will be non-linear. That is, output current $I_1$ of the current source will be a non-linear function of the input frequency $F_{in}$.

Second, the prior art current source requires short response times for current sources $I_3$ and $I_4$. Fast response times very small transients during turn-on and turn-off of $I_3$ and $I_4$ are required to prevent additional non-linearity in the transfer function of the prior art current source.

To facilitate circuit design, the output of a current source should be a linear function of the input signal. The main disadvantage of the prior art approach is the need for several high-speed high-performance components to maintain linearity in the transfer function. High speed devices may be possible in bipolar or BiCMOS circuits, but are not practical in a CMOS only technology.

Because of the high speed switching requirements of the prior art capacitor based current source, only resistor based current sources are available for use in a CMOS only technology. There exists a need for a CMOS frequency and capacitor based current source that can be used in process invariant capacitor based CMOS circuits. For example, such a frequency and capacitor based current source could be used in a basic timer or delay circuit. FIG. 8(A) illustrates a capacitor based timer or delay circuit of the prior art. Input $V_{in}$ of the circuit is coupled to the gates of PMOS transistor 803 and NMOS transistor 804. The source of transistor 803 is coupled to the first terminal of capacitor $C_t$ and to the positive terminal of voltage source $V_{trip}$. The drain of transistor 803 is coupled to the drain of transistor 804, the second terminal of capacitor $C_t$, and the inverting input of comparator 807. The negative terminal of voltage source $V_{trip}$ is coupled to the non-inverting input of the comparator 807. The source of transistor 804 is coupled to a resistor based constant current source 801. The current I of current source 801 is equal to $V_r/R$, where $V_r$ is an internal reference voltage and R is the effective resistance of current source 801. Reset input RST is coupled to comparator 807, and is used to reset the comparator once the delayed pulse has been generated.

The waveforms of the timer/delay circuit are shown in FIG. 8(B). Input $V_{in}$ is a voltage pulse. Transistors 803 and 804, and capacitor $C_t$, act as a ramp generator, charging and discharging capacitor $C_t$ at a fixed rate. Comparator 807 is used to determined when the voltage $V_{cap}$ on capacitor $C_t$ exceeds a threshold value ($V_{trip}$).

The total delay $T_{del}$ introduced by the timer/delay circuit of FIG. 8(A) is given by $$T_{del} = V_{trip}^*C_t/I + T_{comp}$$

where $I = V_r/R$ is the magnitude of the current source, and $T_{comp}$ is the intrinsic delay of comparator 807. Substituting for I, the total delay $T_{del}$ is then $$T_{del} = (V_{trip}/V_r)^*C_t^*R + T_{comp}$$

The effects of the voltages $V_{trip}$ and $V_r$ on the total delay $T_{del}$ can be cancelled out if $V_r$ is a function of $V_{trip}$ or visa versa. However, variations in the values or performance of resistor R and capacitor $C_t$ cannot be cancelled out because there is no relationship between the two component values. To compensate against the effects of resistor and capacitor value and performance variations, the current I is generally trimmed in such a way as to trim the effect of capacitor $C_t$. This trimming process requires the circuit designer to first measure the untrimmed total delay $T_{del}$ of the timer/delay circuit to determine the required trim value. This is a time consuming and tedious process.

FIG. 3(A) illustrates a typical prior art trim/compensation scheme as applied to a current mirror. The current mirror consists of PMOS transistors 301 and 302. The sources of transistors 301 and 302 are connected to voltage supply VPA. The gates of transistors 301 and 302 are connected to the drain of transistor 301 which has drain current I flowing through it. The drain of transistor 302 is connected to circuit 305.

All of the other components in FIG. 3(A) relate to the prior art trim/compensation scheme. The gates of PMOS transistors 303 and 304 are connected to the gate of transistor 301. The sources of transistors 303 and 304 are connected to voltage source VPA. The drain of transistor 303 is connected to the source of PMOS transistor 308. The drain of transistor 308 is connected to circuit 305. The gate of transistor 308 is connected to the first terminal of resistor 310 and the second terminal of zener diode 312. The second terminal of resistor 310 is connected to voltage supply VPA, and the first terminal of zener diode 312 is connected to ground. The drain of transistor 304 is connected to the source of PMOS transistor 309. The drain of transistor 309 is connected to circuit 305. The gate of transistor 309 is connected to the first terminal of resistor 311 and the second terminal of zener diode 313. The second terminal of resistor 311 is connected to voltage supply VPA, and the first terminal of zener diode 313 is connected to ground.

Zener diodes 312 and 313 do not allow current to flow through resistors 310 and 311 to ground. Consequently, nodes 315 and 316 are held at voltage VPA, transistors 308 and 309 are turned off, and no current is flowing through transistors 303 and 304 ($I_1 = I_2 = 0$).

The circuit in FIG. 3(A) is designed to trim the input current $I_{in}$ so that it is equal to the drain current I flowing through transistor 301. To see how this works, suppose that after manufacturing the current mirror, current $I_0$ supplied by transistor 302 is only equal to 0.90I. Assume also that transistor 303 is 5% of the physical size of transistors 301 and 302, and that transistor 304 is 1%. The value of current $I_{in}$ should be as close to that of current I as possible. To achieve this, a very large input signal is applied at Input$_2$ to "zap," or break down, zener diode 312. After zener diode 312 is "zapped," we remove the signal at Input$_2$ so that resistor 310 is shorted to ground. Grounding node 315 lowers the gate voltage of transistor 308 and allows current $I_1$ to flow into circuit 305. Current $I_{in}$ is now equal to $I_0 + I_1 = 0.90I + 0.05I = 0.95I$.

By "turning on" additional trimming transistors (such as 304), current $I_{in}$ can be increased until it is as close as possible to current I. Generally, the "zener zap" trimming process involves five steps:

1. Apply power and signal to circuit to be compensated.

2. Measure the resultant output (current, voltage or frequency).

3. Adjust the trim until the resultant output is within the desired specification.

4. "Burn-in" the trim value by "zapping" the anti-fuse (or fuse). Typically, the anti-fuse is a zener diode.

5. Repeat step 2 and check to see if the new resultant output remained within specification. If not, then fail the part.

The "zener zapping" method of compensation is time-consuming and inaccurate. The measuring/zapping procedure itself may take 5-10 seconds per compensation to accomplish. Further, often the "fuse" resists zapping, or is already zapped as a result of production. Also, zener zapping is permanent, i.e., once a circuit has been "zapped" compensation cannot be reversed. Thus, component performance "drifting" due to time and temperature variations cannot be compensated for with the zener zapping method.

Another prior art technique for trimming is illustrated in FIG. 3(B). The zener diode configuration of FIG. 3(A) is replaced with priority encoder 306. Priority encoder 306 is connected to nodes 315 and 316 through lines 317 and 318. Input 330 enables priority encoder 306 to monitor the input current $I_{in}$ to circuit 305. Outputs $E_1$ and $E_2$ are connected to nodes 315 and 316 of FIG. 3(A). By monitoring current $I_{in}$ priority encoder 306 determines which trimming components should be activated to best match current $I_{in}$ to current I. For example, instead of "zapping" zener diode 312 to turn on transistor 308 as described above, priority encoder 306 simply changes output E1 from high to low.

The use of priority encoders in trim/compensation schemes is an improvement over the "zener zapping" trimming process. The priority encoder is quicker, more reliable and able to adjust compensation levels "on the fly" by switching trimming components in or out as needed to compensate for drift due to time or temperature variations.

One factor that is often trimmed or compensated for is the RC time constant of a circuit. Unfortunately, using the priority encoder in conjunction with additional circuitry, circuit designers are able to trim the values of R and C separately, but are unable to trim the product of RC simultaneously. This results in inefficient and often inaccurate trimming.

SUMMARY OF THE PRESENT INVENTION

The present invention is a constant current source whose magnitude is proportional to capacitor ratios, reference voltage and input frequency. The current switches of the present invention provide a known quantity of charge to a summing node at regular intervals. A continuous current sink then bleeds this quantity of charge from the node at a constant rate of. The output current of the present invention is then equal to the product of a capacitor value, a reference voltage, and an input frequency.

The preferred embodiment of the present invention does not suffer any of the disadvantages of the prior art frequency and capacitor based current sources. Unlike the prior art, the preferred embodiment does not require high-speed, high performance components to produce an output current with small AC components. Additionally, the preferred embodiment can be used in a process invariant circuit where variations in the circuit's components' values and performances are eliminated.

A frequency divider provides a plurality of signals to one of a plurality of capacitor switches located within a charge generator. The outputs of the capacitor switches are combined to provide a single stream of charge to an output generator. A controller monitors the magnitude of this stream of charge, and provides a control signal to the output generator to control and limit variations in the magnitude of output current.

The preferred embodiment of the present invention may be used in conjunction with process invariant circuits in a variety of semiconductor technologies: CMOS, Bipolar, BiCMOS and GaAs. In one embodiment, the present invention is used in conjunction with a timer/delay circuit. In another embodiment, the present invention is used in conjunction with a calibration circuit to compensate for an RC time constant in a circuit.

BRIEF DESCRIPTION OF THE DRAWINGS

FIGS. 1(A) and 1(B) illustrate a circuit diagram and resultant waveforms of a capacitor based current source of the prior art.

FIGS. 2(A) and 2(B) illustrate a circuit diagram and resultant waveforms of the preferred embodiment of the present invention.

FIGS. 3(A) and 3(B) illustrate circuit diagrams of prior art trim/compensation schemes.

FIG. 10 illustrates a circuit diagram for a calibration circuit.

DETAILED DESCRIPTION OF THE PRESENT INVENTION

An apparatus for providing a constant current source whose magnitude is proportional to the input frequency, reference voltage and capacitor value is described. The present invention is used to provide a constant source of current in CMOS process invariant circuits. In the following description, numerous specific details are described in order to provide a thorough understanding of the present invention. It will be apparent, however, to one skilled in the art, that the invention may be practiced without these specific details. In other instances, well known features have not been described in detail in order not to unnecessarily obscure the present invention.

The present invention overcomes the disadvantages of the prior art and may be used in process invariant circuits. Process invariant circuits using the present invention will exhibit an invariance to reference voltage and capacitor size variations.

The preferred embodiment of the present invention does not suffer any of the disadvantages of the prior art frequency and capacitor based current sources. These prior art sources require a high-speed, high performance comparator and current sources to produce a near-DC output current. The preferred embodiment, on the other hand, produces an output current with small AC components without the aid of these high-speed components. Consequently, the preferred embodiment can be used in a variety of technologies: CMOS, Bipolar, BiCMOS and GaAs. Additionally, the preferred embodiment can be used in a process invariant circuit where variations in the circuit's components' values and performances are eliminated.

Figure 4A:
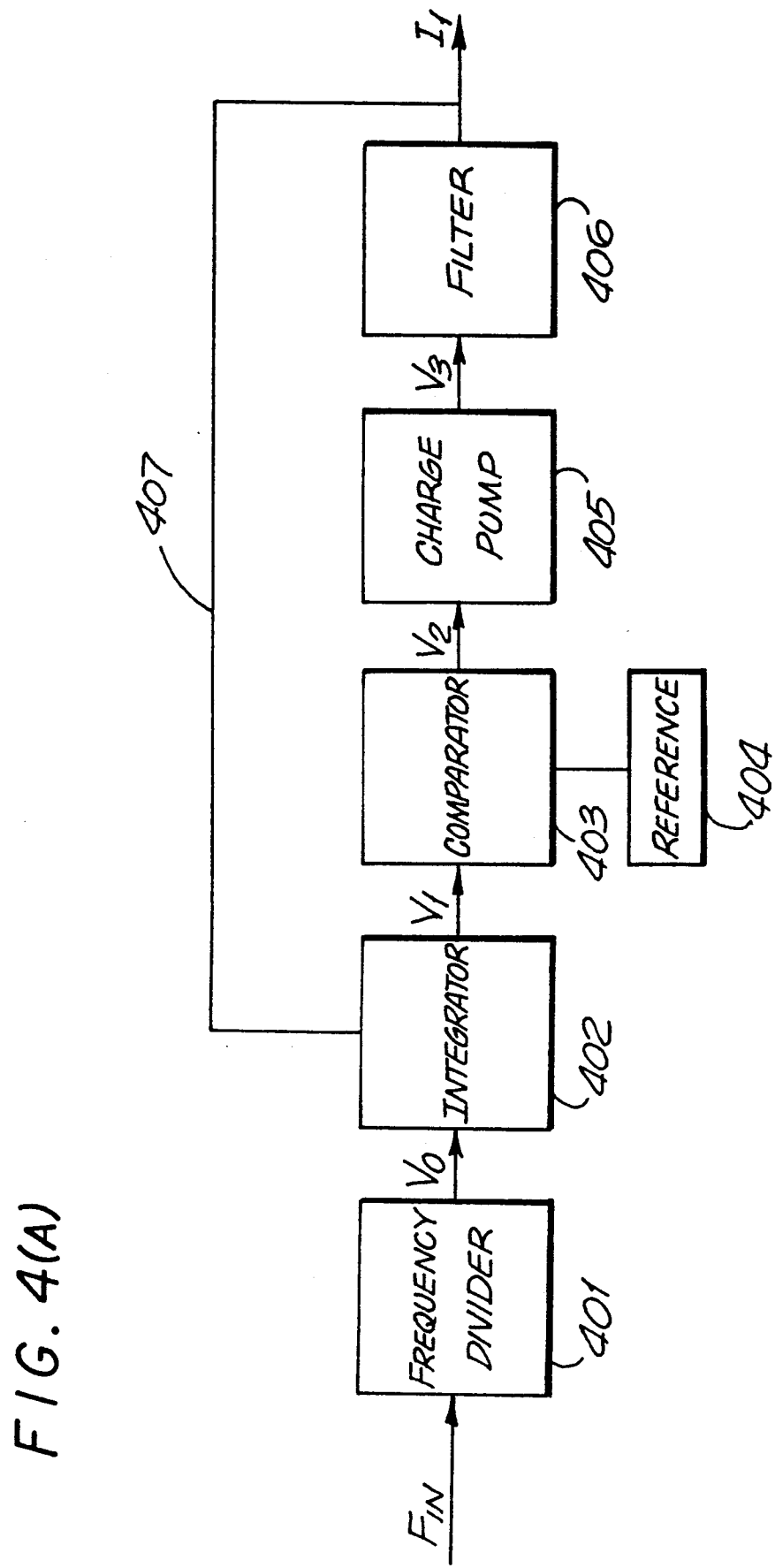
FIG. 4(A) is a block diagrams of a capacitor based current source of the prior art.
Figure 4B:
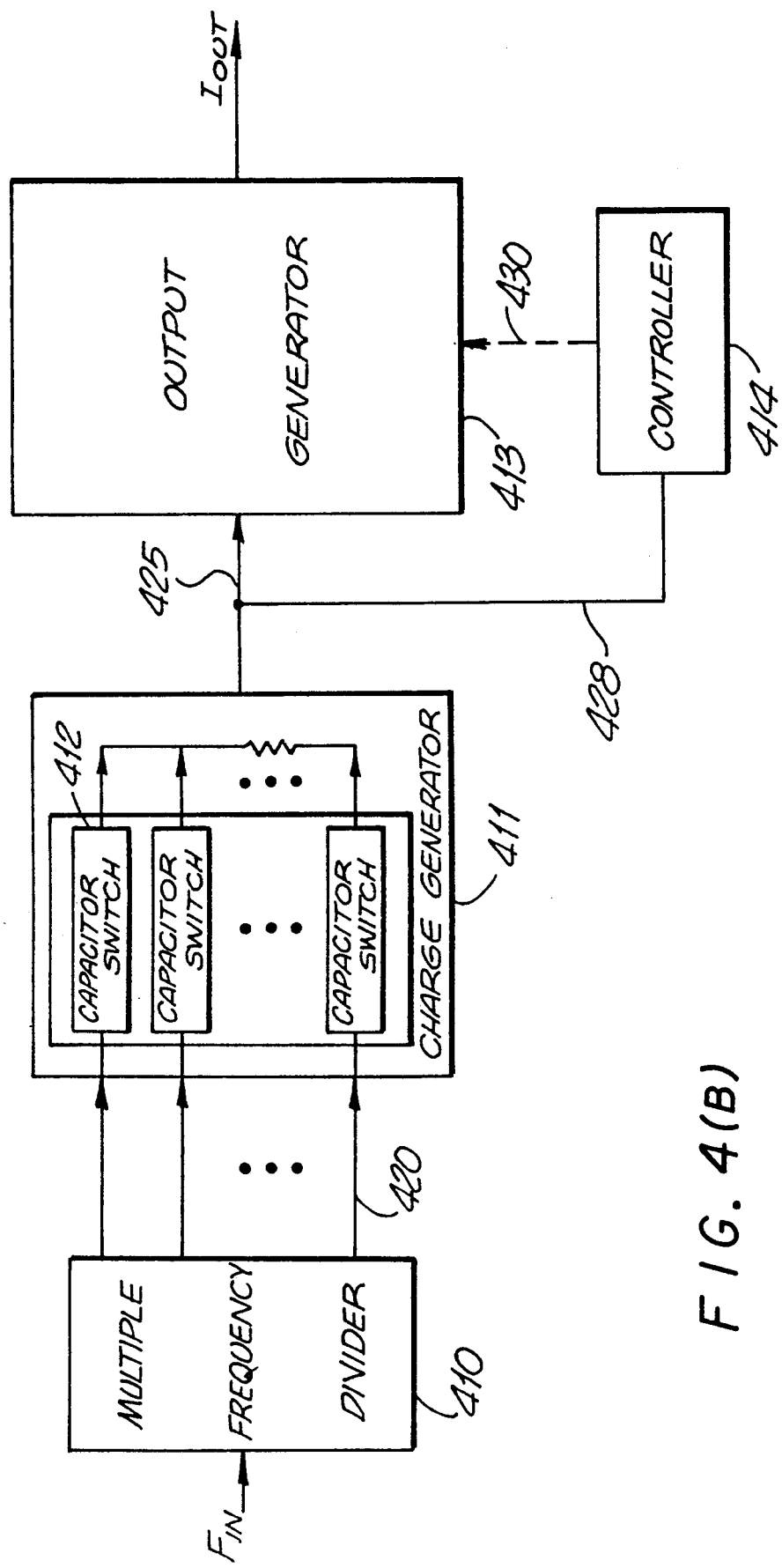
FIG. 4(B) is a block diagrams of a capacitor based current source of the present invention.

A block diagram of the present invention is illustrated in FIG. 4(B). The input signal is divided up into several separate signals. These signals drive each of the capacitor switches located within the charge generator. The capacitor switches alternately charge and discharge so that a nearly constant stream of charge is provided to the output generator. The output generator produces an output current that is essentially devoid of AC components. A controller constantly monitors the magnitude of the stream of charge packets produced by the charge generator, and provides a feedback signal to the output generator to adjust and maintain the uniformity of the output current.

Frequency divider 410 takes input signal $F_{in}$ and produces a plurality of signals 420. The period of each of the signals 420 is a multiple of the period of signal $F_{in}$. That is, if $F_{in}$ has period $T_0$, then each signal 420 has period $MT_0$, where M is some integer greater than or equal to two. Each of the signals 420 is connected to one of a plurality of capacitor switches 412 located within charge generator 411. The outputs of capacitor switches 412 are combined to produce a single stream of charge. This stream of charge is provided to output generator 413 via line 425. The magnitude of this stream of charge is monitored by controller 414 via line 428. Controller 414 provides control signal 430 to output generator 413 to control and limit variations in the magnitude of output current $I_{out}$.

Figure 1A:
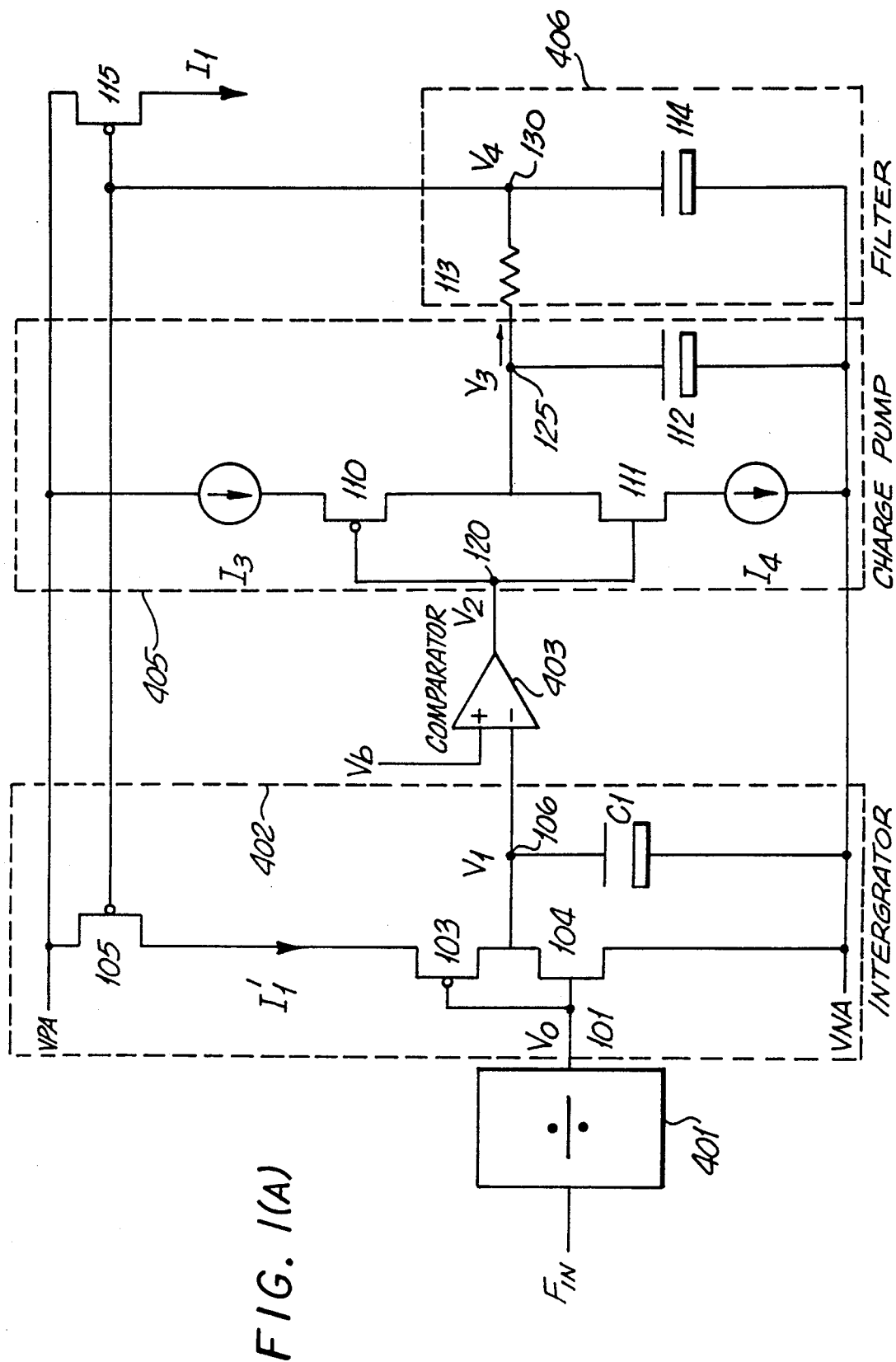
Figure 2A:
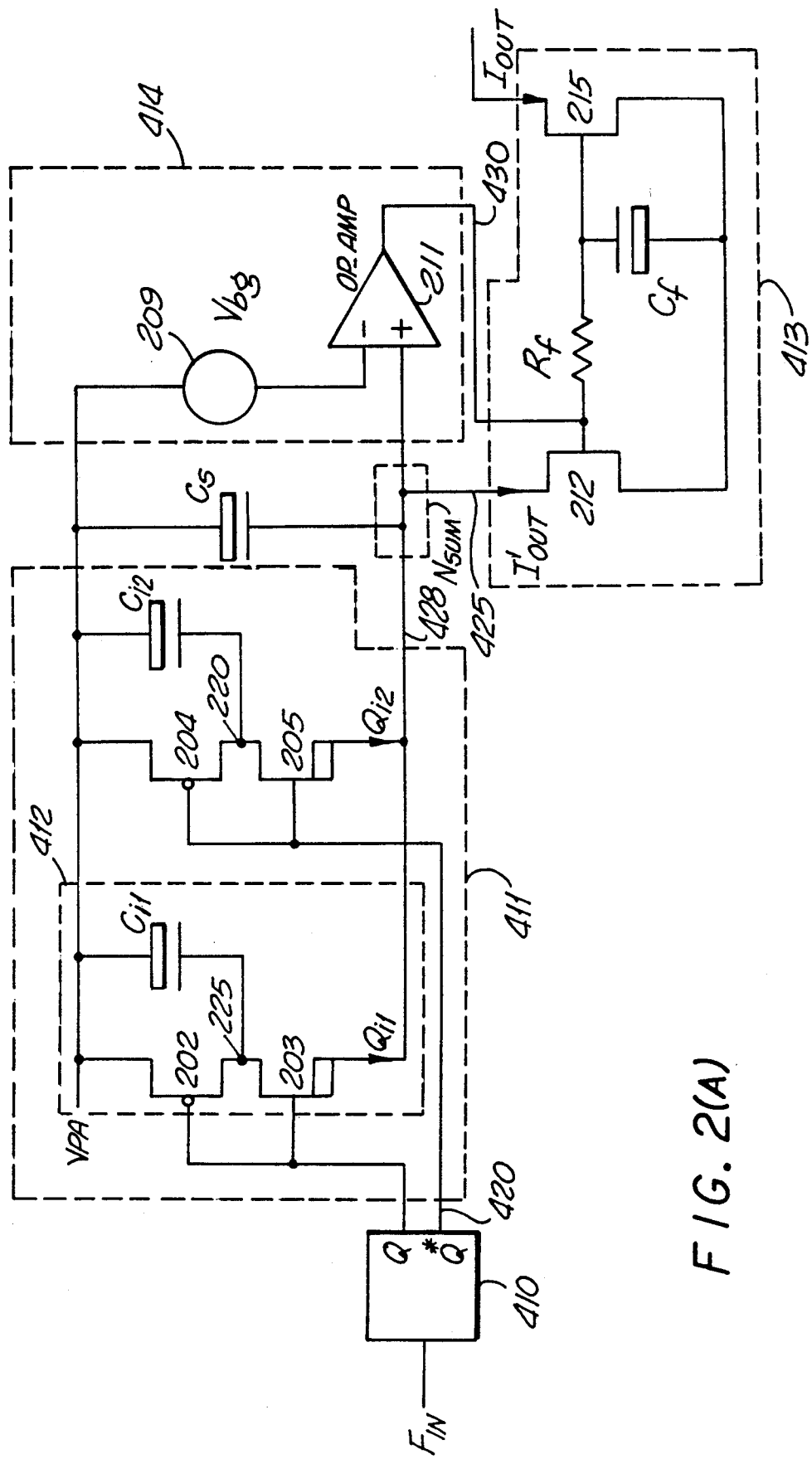

The preferred embodiment of the present invention is illustrated in FIG. 2(A). The clock signal $F_{in}$ is coupled to frequency divider 410. Frequency divider 410 is coupled to two capacitor switches. Output Q of frequency divider 410 is coupled to two gates of PMOS transistor 202 and NMOS transistor 203. The source of transistor 202 is coupled to voltage supply VPA. The drain of transistor 202 is coupled the first terminal of capacitor $C_{i1}$ and to the drain of transistor 203. The source of transistor 203 is coupled to node Nsum. The second terminal of capacitor $C_{i1}$ is coupled to voltage supply VPA.

Output Q* of frequency divider 410 is coupled to the gates of PMOS transistor 204 and NMOS transistor 205. The source of transistor 204 is coupled to voltage supply VPA. The drain of transistor 204 is coupled the first terminal of capacitor $C_{i2}$ and to the drain of transistor 205. The source of transistor 205 is coupled to node $N_{sum}$. The second terminal of capacitor $C_{i2}$ is coupled to voltage supply VPA.

The first terminal of capacitor $C_s$ is coupled to voltage supply VPA, and the second terminal is coupled to node $N_{sum}$. The positive terminal of voltage source 209 is coupled to voltage supply VPA, and the negative terminal is coupled to the inverting input op-amp 211. The output of op-amp 211 is coupled to the gate of NMOS transistor 212 and to the first terminal of resistor $R_f$. The non-inverting input of op-amp 211 is coupled to node $N_{sum}$.

The drain of transistor 212 is coupled to node $N_{sum}$. The source of transistor 212 is coupled to the first terminal of capacitor $C_f$ and to the source of NMOS transistor 215. The second terminal of resistor $R_f$ is coupled to the second terminal of capacitor $C_f$ and to the gate of NMOS transistor 215. Output current $I_{out}$ of the preferred embodiment originates at the drain of transistor 215.

The charge calculations at node $N_{sum}$ are calculated for the condition when input signal $F_{in}$ is divided into two complementary signals each with a 50% duty cycle. This means that each signal is "high" for the same length of time that it is "low," and that when one signal is "high," the other signal is "low," and visa versa. With a 50% duty cycle, capacitors $C_{i1}$ and $C_{i2}$ can be set equal to each other because each capacitor is afforded the same amount of time to charge and discharge. Of course, the invention may be practiced with any duty cycle as long as the appropriate adjustments are made in the magnitude of capacitors $C_{i1}$ and $C_{i2}$ to ensure that a constant rate of charge is dumped on the node $N_{sum}$.

Because the duty cycle of input signal $F_{in}$ is unknown and may not be 50%, the preferred embodiment utilizes frequency divider 410 to produce two complementary signals (Q and Q*) each with a 50% duty cycle.

Figure 6:
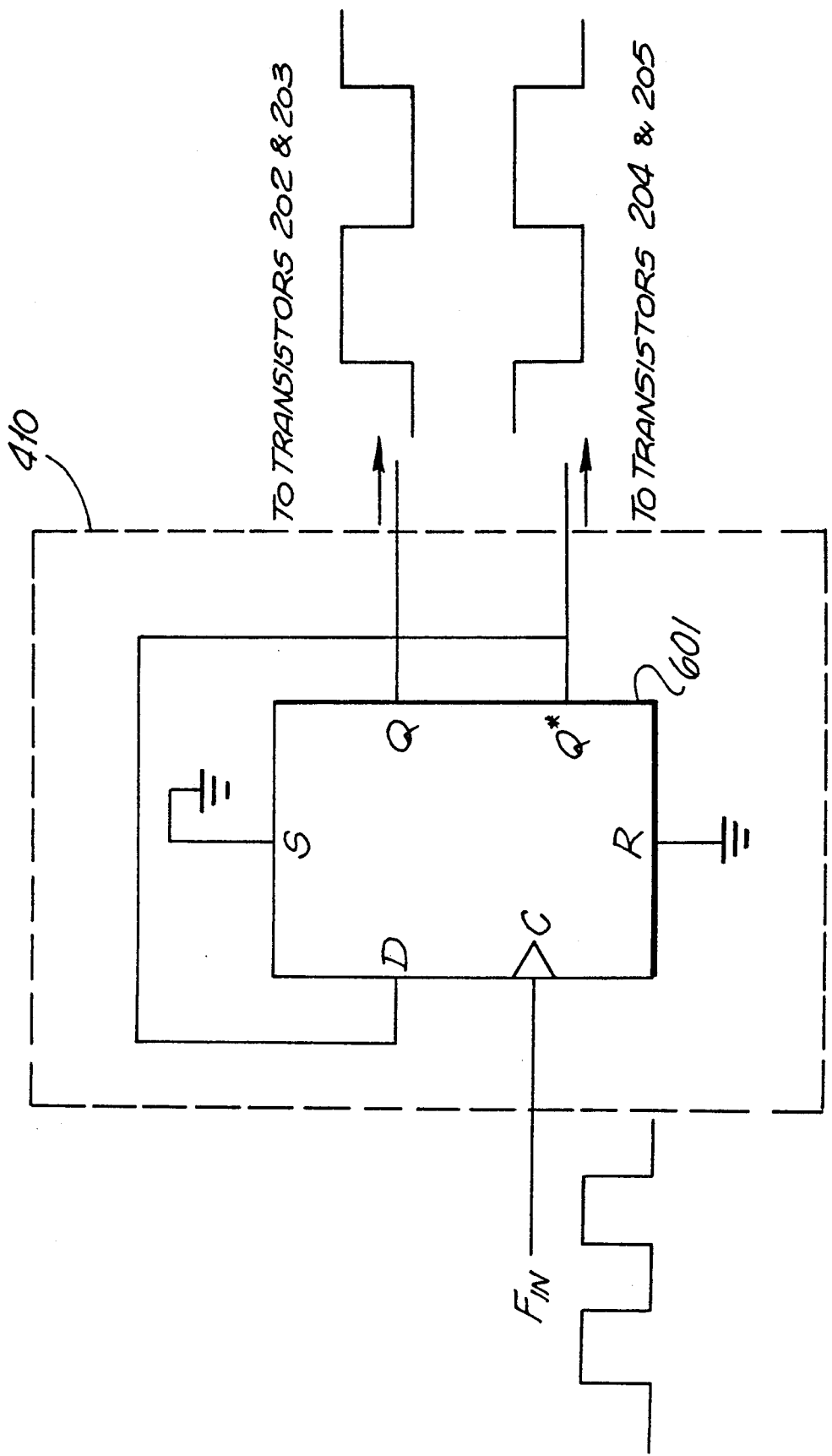
FIG. 6 illustrates the frequency divider of the preferred embodiment.

FIG. 6 illustrates one possible configuration for frequency divider 410. A divide-by-2 circuit consists of toggling flip-flop 601. Flip-flop 601 is a positive-edge-triggered flip-flop with active high SET and CLEAR inputs. The clock input C is connected to input frequency $F_{in}$. Output Q is connected to transistors 202 and 203. Output Q* is connected to data input D, as well as to transistors 204 and 205. Set and reset inputs S and R are tied low (to ground). Flip-flop 601 toggles when input C transitions from low to high. Since input D is tied to output Q*, flip-flop 601 sees the complement of its existing output at input D at the time of the clock pulse. The frequency of outputs Q and Q* is half the frequency of the input signal $F_{in}$.

The waveforms of the preferred embodiment are illustrated in FIG. 2(B). During the first clock period $t_0$ of input $F_{in}$, output Q is high and output Q* is low. PMOS transistor 202 and NMOS transistor 205 are "turned off" (non-conducting) and PMOS transistor 204 and NMOS transistor 203 are "turned on" (conducting). Capacitor $C_{i1}$ discharges its stored charge $Q_{i1}$ through transistor 203 onto node $N_{sum}$. At the same time, node 220 charges to voltage VPA so that charge $Q_{i2}=0$.

With transistor 205 turned off, capacitor $C_{i2}$ does not have an electrical path to discharge, as capacitor $C_{i1}$ does. However, during the second clock period of input $F_{in}$, output Q is low and output Q* is high. PMOS transistor 202 and NMOS transistor 205 are then turned on and PMOS transistor 204 and NMOS transistor 203 are turned off. Node 225 charges to voltage VPA so that $Q_{i1}=0$. At the same time, the voltage of capacitor $C_{i2}$ drops to $V_{bg}$, where $V_{bg}$ is the magnitude of reference voltage source 209. Thus, the charge $Q_{i2}$ transferred through transistor 205 onto node $N_{sum}$ is given by $$Q_{i2} = Q_{final} - Q_{initial}$$
$$= -(C_{i2} * V_{bg}) - (0)$$
$$= -(C_{i2} * V_{bg})$$

In the preferred embodiment $C_{i1}=C_{i2}$, and outputs Q and Q* are complementary signals each with a 50% duty cycle. Consequently, $Q_{i1}=Q_{i2}=Q_i$. Each capacitor "dumps" the same amount of charge $Q_i$ onto node $N_{sum}$ during clock period $t_0$. Current $I'_{out}$ is bled from node $N_{sum}$ by a continuous sink at transistor 212.

Almost no current is drawn into the non-inverting input of op-amp 211. Thus, the steady state condition at node Nsum of the preferred embodiment is defined by:

$$I'_{out}=(Q_{i1}|\text{first period to}+Q_{i2}|\text{second period to})/2t_0$$

$$Q_{i1}=C_{i1}*V_{bg}$$

$$Q_{i2}=C_{i2}*V_{bg}$$

Let $C_{i1}=C_{i2}=C_i$ and $Q_{i1}=Q_{i2}=Q_i$ then $$Q_i=C_i*V_{bg}$$

$$I'_{out}=2Q_i/2t_0=C_i*V_{bg}/t_0$$

but $t_0=1/F_{in}$ so $$I'_{out}=C_i*V_{bg}*F_{in}$$

The current, $I'_{out}$, that is bled from node $N_{sum}$ is equal to the product of the bias voltage $V_{bg}$, capacitor values $C_i$, and input frequency $F_{in}$. The voltage at node $N_{sum}$ is maintained at approximately $(VPA-V_{bg})$ by means of a negative feedback loop provided by op-amp 211. When the voltage at node $N_{sum}$ exceeds this value, op-amp 211 output voltage increases, transistor 212 is "turned on" more, and more current is bled to lower the voltage at node $N_{sum}$. When the voltage drops below $(VPA-V_{bg})$, op-amp 211 output voltage decreases, transistor 212 is "turned on" less, and less current is bled to raise the voltage at node $N_{sum}$.

Transistors 212 and 215 form a "current mirror." That is, the current $I'_{out}$ through transistor 212 is "mirrored", or duplicated, by transistor 215 so that each transistor conducts equal amounts of current. The output current $I_{out}$ produced by transistor 215 is therefore equal to the current bled from node $N_{sum}$, or $$I_{out}=I'_{out}=C_i*V_{bg}*F_{in}$$

Even with the feedback loop, the voltage at node $N_{sum}$ does not remain constant. Instead, the voltage at node $N_{sum}$ fluctuates around $(VPA-V_{bg})$, as shown in FIG. 2(B). These fluctuations are due primarily to the switching characteristics of capacitors $C_{i1}$ and $C_{i2}$. The voltage variations at node $N_{sum}$ introduce some AC components into what should ideally be a DC current. These AC components produce a ripple voltage at node $N_{sum}$ and a ripple current in the output current $I_{out}$.

To reduce these ripple effects, the preferred embodiment incorporates two separate features. First, a large capacitor $C_s$ is connected between voltage supply VPA and node $N_{sum}$. Capacitor $C_s$ should be sufficiently large (compared to $C_{i1}$ and $C_{i2}$) to minimize the ripple voltage on the node $N_{sum}$. For example, capacitor $C_s$ could be set equal to 20 to 40 times the value of $C_{i1}$ and $C_{i2}$. Any large capacitance connected to node $N_{sum}$ will help to eliminate AC components in the output current $I_{out}$. For example, a Miller capacitor may be added to node $N_{sum}$ to increase the effective size of $C_s$. The op-amp that drives the Miller capacitor should have a relatively low output impedance. In a BiCMOS process, the Miller effect can be used to reduce the required size of capacitor $C_s$.

The second feature for reducing ripple effects is a low pass filter that is inserted into the current mirror. This low pass filter consists of resistor $R_f$ and capacitor $C_f$. AC components in the current $I'_{out}$ bled from node $N_{sum}$ and, correspondingly, the output current $I_{out}$ of the preferred embodiment, are further reduced by this low pass filter. However, the low pass filter can be removed from the current if capacitor $C_s$ is made sufficiently large (with or without a Miller capacitor), or if the system can tolerate a higher ripple current at the output.

Figure 5A:
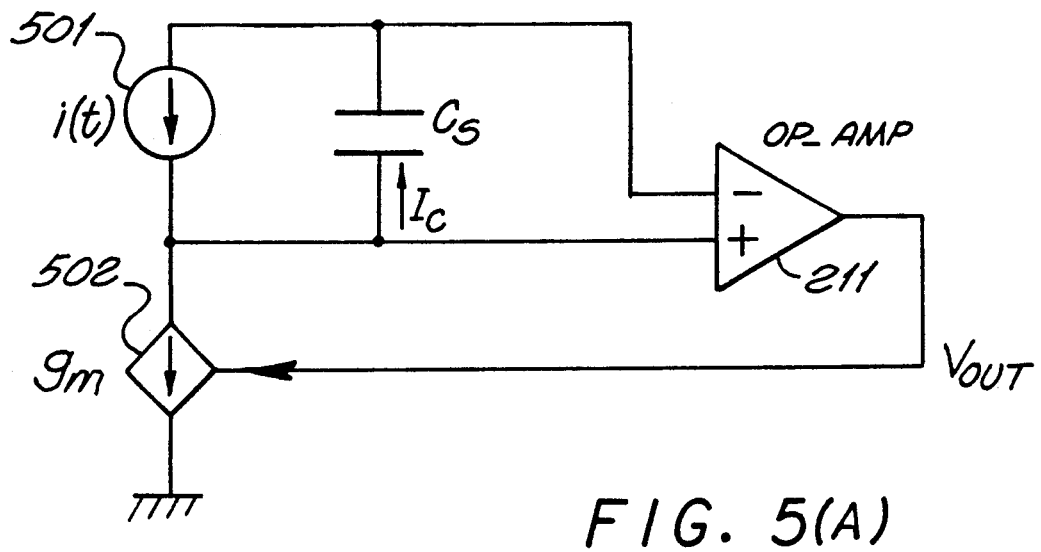
FIGS. 5(A) and 5(B) illustrate two circuits of the preferred embodiment.

When the preferred embodiment is first "powered up," the feedback loop immediately attempts to pull the voltage at node $N_{sum}$ up to its steady state voltage, $(VPA - V_{bg})$. Instead of achieving this voltage exactly the first time, the voltage at node $N_{sum}$ alternatively overshoots, then undershoots, this steady state value. When these transient oscillations eventually decay exponentially to zero over time, the circuit is considered stable. A small signal equivalent circuit of the preferred embodiment is illustrated in FIG. 5(A). In this equivalent circuit, the frequency divider 410 and two capacitor switches are modeled as current source 501. The current mirror is modeled as dependent current source 502 with an output current equal to $g_m$ times the output voltage, $v_{out}$, of op-amp 211.

Figure 5B:
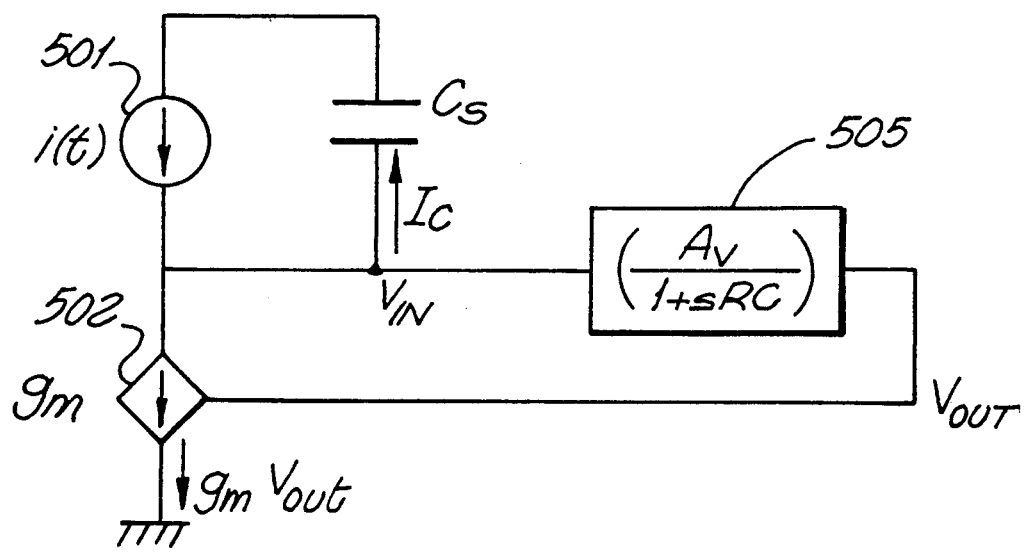

Op-amp 211 is modeled in FIG. 5(B) as block 505. Block 505 has a transfer function, $V_{out}/V_{in}$, equal to $A_v/(1+sRC)$, where $A_v$ is the open loop gain, $s = j\omega = \omega^* \sqrt{-1}$, and $\omega$ is the input frequency. For the output voltage, $v_{out}$, to be stable, we must determine under what conditions the transient oscillations in $v_{out}$ will decay to zero. Solving for $v_{out}$ we have, $$Vout = (Vin)(\text{gain of op-amp})$$

$$= I_c \left( \frac{1}{sC_s} \right) \left[ \frac{A_v}{(1 + sBC)} \right]$$

$$= (i(t) - g_m Vout) \left( \frac{1}{sC_s} \right) \left[ \frac{A_v}{(1 + sRC)} \right]$$

$$Vout = \frac{i(t)A_v}{sC_s(1 + sRC)} - \frac{g_m A_v}{sC_s(1 + sRC)} Vout$$

Then, solving for Vout we have $$Vout = \frac{\frac{i(t)A_v}{sC_s(1 + sRC)}}{1 + \frac{g_m A_v}{sC_s(1 + sRC)}}$$

$$= \frac{i(t)A_v}{sC_s(1 + sRC) + g_m A_v}$$

$$= \frac{i(t)A_v}{s^2 C_s RC + sC_s + g_m A_v}$$

$$= \frac{i(t)A_v}{C_s RC} \left[ \frac{1}{s^2 + \frac{1}{RC} \cdot s + \frac{g_m A_v}{C_s RC}} \right]$$

If the denominator of the equation defining Vout is of the form $$S^2 + 2\omega_0 \epsilon S + \omega_0^2$$

then $\epsilon$ is defined as the damping factor of the circuit. From this equation we have $$\omega_0^2 = \frac{g_m A_v}{C_s RC}$$

$$\omega_0 = \left( \frac{g_m A_v}{C_s RC} \right)^{\frac{1}{2}}$$

Solving for $\epsilon$ gives $$2\omega_0 \epsilon = \frac{1}{RC}$$

$$\epsilon = \frac{1}{2\omega_0 RC}$$

$$= \frac{1}{2RC} \left( \frac{C_s RC}{A_v g_m} \right)^{\frac{1}{2}}$$

$$= \frac{1}{2} \left( \frac{C_s}{RC A_v g_m} \right)^{\frac{1}{2}}$$

$$= \frac{1}{2} \frac{1}{\sqrt{A_v}} \left( \frac{C_s/g_m}{RC} \right)^{\frac{1}{2}}$$

The damping factor equation defines the stability of the circuit. Ideally, the gain of op-amp 211, $A_v$, should not be high. The ratio of $(C_s/g_m)^*(1/RC)$ to $A_v$ should be near unity for a critically damped system.

The preferred embodiment does not suffer any of the disadvantages of the prior art frequency and capacitor based current sources. As stated above, the main disadvantage of the prior art approach is the need for several high-speed high-performance components to maintain linearity in the transfer function. The preferred embodiment can operate in a CMOS only environment because it does not require any high-speed components. Because of the high capacitive load connected to node $N_{sum}$, operational amplifier 211 sees essentially a DC signal across its inputs. Consequently, op-amp 211 does not need to have the high-speed switching capabilities of comparator 403 of the prior art. The preferred embodiment also operates without the high-performance current sources, $I_3$ and $I_4$, that the prior art requires. Further, although the preferred embodiment is described in CMOS technology, the present invention may be practiced in any technology, such as Bipolar, BiCMOS, and GaAs.

Although the preferred embodiment uses two capacitor switches ($C_{i1}$ and $C_{i2}$), the present invention may be practiced with any number of capacitor switches. In fact, the present invention could be practiced with n capacitor switches connected to node $N_{sum}$, each capacitor switch receiving an input pulse from a divide-by-n frequency divider.

The magnitude of the current of the present invention is controlled by the size of the switch capacitors ($C_i$'s), the reference voltage ($V_{bg}$), and the reference frequency ($F_{in}$).

Figure 8A:
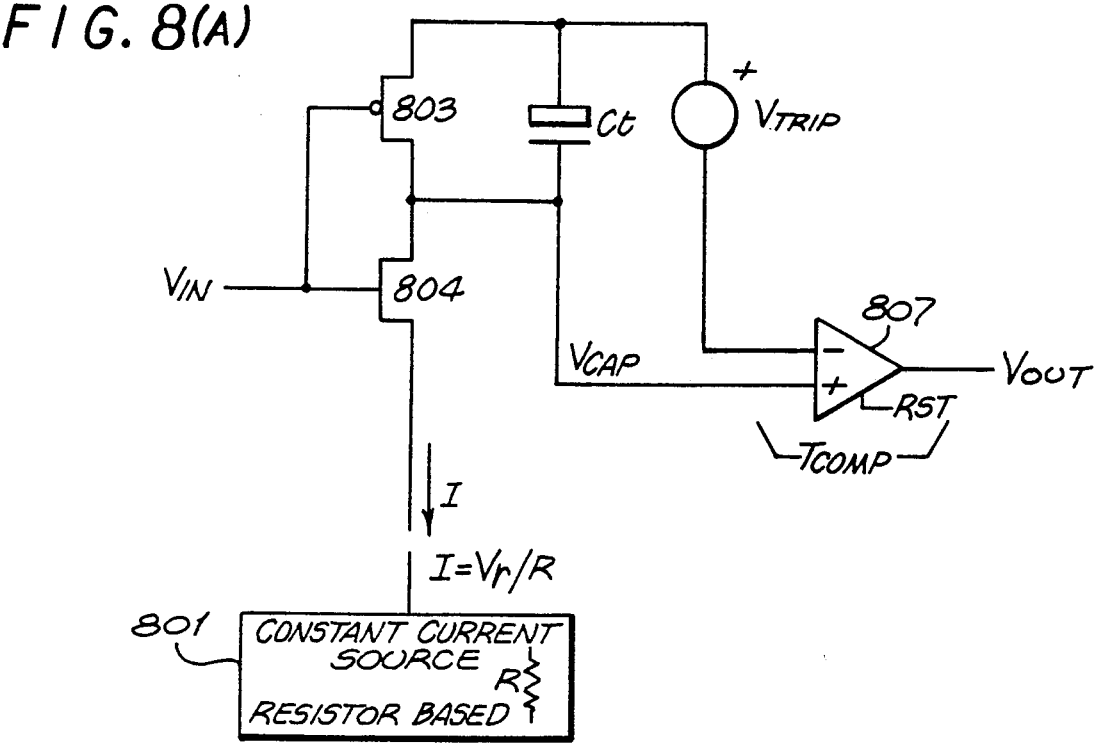
FIGS. 8(A) and 8(B) illustrate a circuit diagram and resultant waveforms for a timer/delay circuit using a resistor based current source.
Figure 8B:
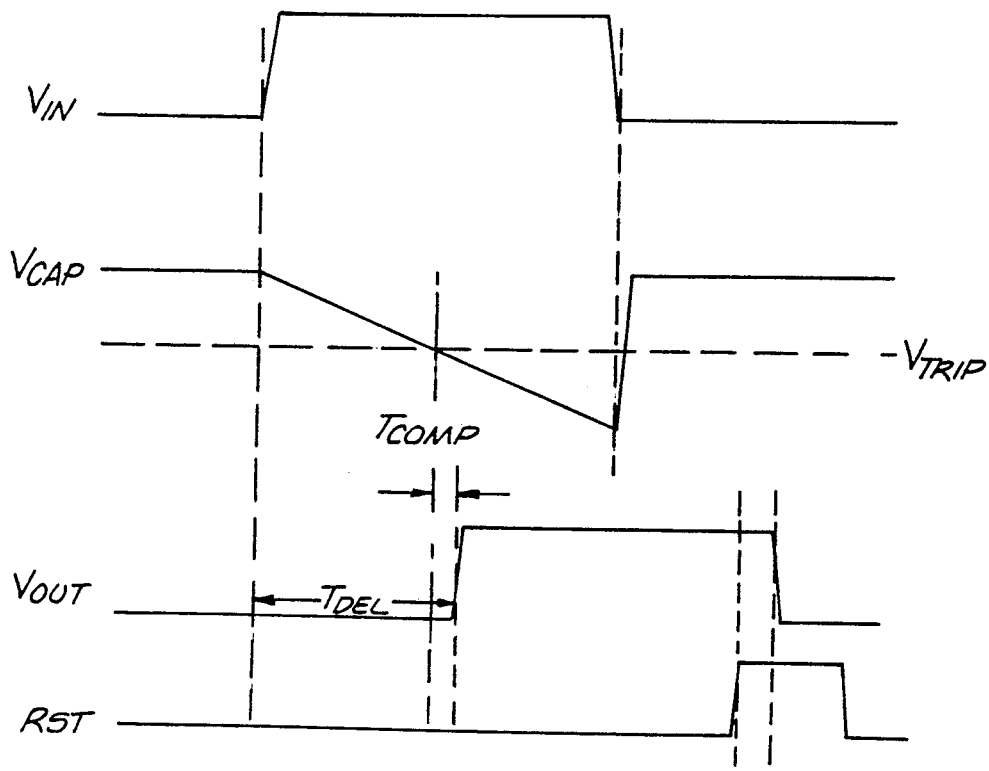
Figure 9A:
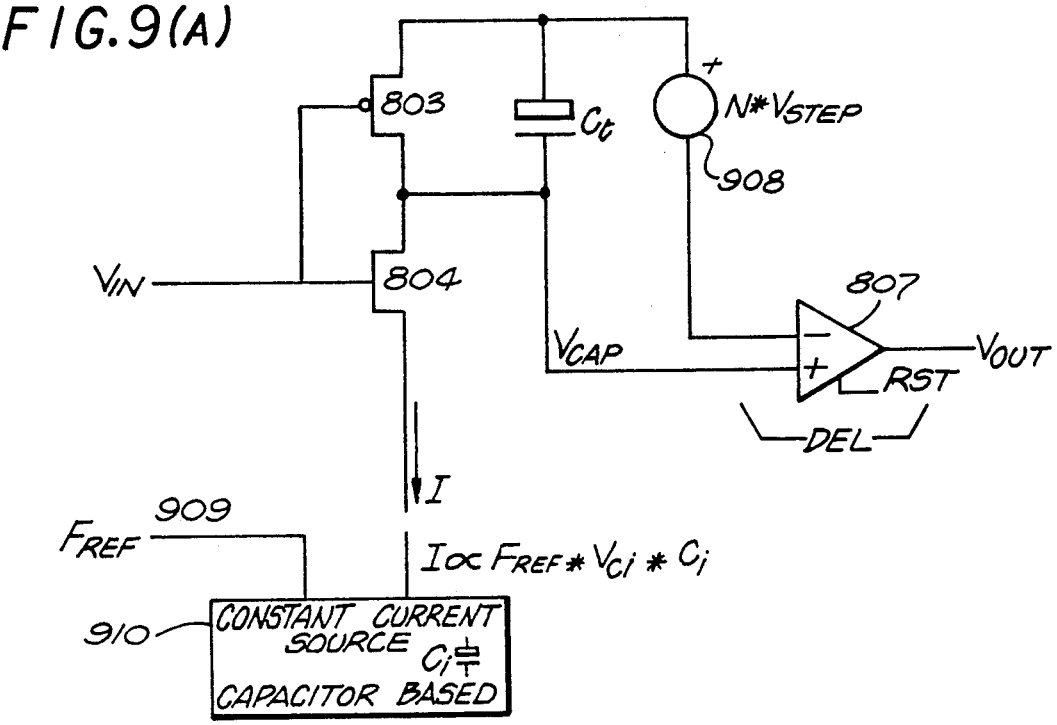
FIGS. 9(A) and 9(B) illustrate a circuit diagram and resultant waveforms for a timer/delay circuit using the preferred embodiment.

Although the preferred embodiment of the present invention can be used in any circuit where a constant source of current is required, the preferred embodiment is ideal for use in capacitor based process invariant circuits. For example, the preferred embodiment can be used in the basic timer/delay circuit described above in place of the resistor based constant current source. This is illustrated in FIG. 9(A). This timer/delay circuit is similar to the circuit illustrated in FIG. 8(A), except that voltage source $V_{trip}$ is replaced by voltage source 908, the source of transistor 804 is coupled to the preferred embodiment 910, and reference frequency $F_{ref}$ has been added to current source 910. The magnitude of voltage source 908 is equal to $N*V_{step}$, where N is some digital value. The current of current source 910 is proportional to $F_{ref}*V_{Ci}*C_i$, where $V_{Ci}$ is the internal reference voltage and $C_i$ is the capacitance of either capacitor switch of the preferred embodiment.

Figure 9B:
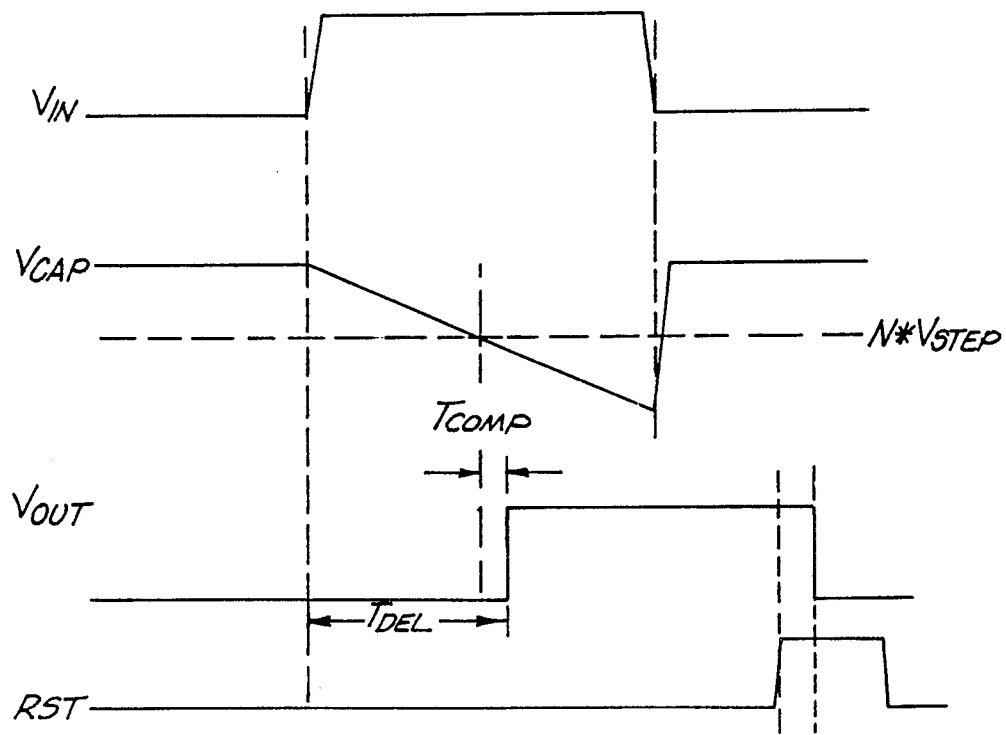

The waveforms of the timer/delay circuit using the preferred embodiment are shown in FIG. 9(B). The operation of this circuit is similar to that of the circuit in FIG. 8(A). However, the total delay $T_{del}$ introduced by the timer/delay circuit of FIG. 9(A) is given by $$T_{del} = N * V_{step} * C_t/I + T_{comp}$$
$$= (N/F_{ref}) * (V_{step}/V_{Ci}) * (C_t/C_i) + T_{comp}$$

where $I = F_{ref}*V_{Ci}*C_i$ is the constant current provided by current source 910. The effects of voltages $V_{step}$ and $V_{Ci}$ on the total delay $T_{del}$ can be cancelled out if $V_{Ci}$ is a function of $V_{step}$ or visa versa. Unlike the timer/delay circuit of the prior art, variations in the value or performance of capacitor $C_t$ can now be cancelled out through the use of capacitor $C_i$. The ratio $C_t/C_i$ can be tightly controlled in manufacturing, as can the ratio $V_{step}/V_{Ci}$. This results in an accurate total delay, $T_{del}$, that can be expressed as a function of the reference frequency $F_{ref}$ and some digital number N. The value of $F_{ref}$ can be extremely accurate if a crystal source is used to generate the frequency.

The use of the preferred embodiment of the present invention has no effect on the intrinsic delay of the comparator, $T_{comp}$. A description explaining how the magnitude of $T_{comp}$ can be minimized is given in co-pending U.S. patent application Ser. No. 07/779963 entitled "HIGH SPEED THRESHOLD CROSSING DETECTOR WITH RESET" filed on Oct. 21, 1991 and assigned to the Assignee of the present invention.

In some timer/delay applications, the total delay $T_{del}$ is not critical. Instead, it is the difference in delay times between different values of N that is important. Thus, if $T_{del}(p)$ and $T_{del}(k)$ are the total delay introduced by the timer/delay circuit when N is equal to p and k, respectively, then the difference between these two delays is given by $$T_{del}(p - k) = T_{del}(p) - T_{del}(k)$$
$$= (p - k) * (V_{step}/V_{Ci}) * (C_t/C_i)/F_{ref}$$

In these applications, the intrinsic delay, $T_{comp}$, of comparator 807 is completely cancelled out. $T_{del}(p-k)$ can be controlled very accurately without having to trim individual components during wafer production. In theory, the preferred embodiment allows for a timer/delay circuit that is much more tolerant to process variations because all parameters of interest are controlled by ratios of capacitors and voltages. Additionally, the preferred embodiment can be used in any circuit where process invariance is required. In theory, using the preferred embodiment a designer could build a process invariant circuit that performs within specifications even when the processing of the individual circuit components is not within specification.

The preferred embodiment of the frequency and capacitor based current source can also be used in an on-chip trim/compensation scheme designed to replace the current "zener zapping" trimming process. Unlike the prior art, the preferred embodiment may be used in conjunction with a calibration circuit to trim for the RC constant of a circuit.

FIG. 10 illustrates a calibration circuit. Resistors 1001-1008 are connected in series with the first terminal of resistor 1001 connected to voltage supply VPA. The second terminal of resistor 1001 is connected to the non-inverting input of comparator 1010 and to the first terminal of resistor 1002. Each of the other resistors 1002-1008 are similarly connected to each other and to the non-inverting inputs of comparators 1011-1017. The inverting inputs of comparators 1010-1017 are all connected to node 1031, where $V_{ref}$ is held. Latch 1033 is tied to the latch inputs of comparators 1010-1017. The outputs of comparators 1010-1017 are connected to the inputs of priority encoder 1020. Priority encoder 1020 selects the appropriate trim value required for compensation. Priority encoder 1020 has eight outputs $E_{n0}$-$E_{n7}$.

Figure 7:
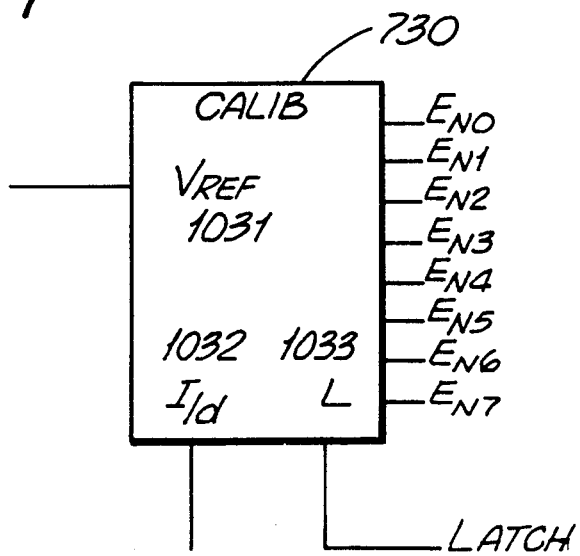
FIG. 7 is a block diagram of a calibration circuit.

FIG. 7 illustrates a block diagram of calibration circuit 730 of FIG. 10. Calibration circuit 730 has three inputs, voltage reference 1031, load current 1032 and latch input 1033. Circuit 730 also has eight outputs, $E_{n0}$-$E_{n7}$.

Calibration circuit 730 is connected to additional circuitry (including the preferred embodiment) to perform the desired trim operation. Based on the topology of the calibration circuit and the additional circuitry, the trim/compensation circuit can be used (with the preferred embodiment) to trim for various circuit components. Each of the resistors 1001-1008 are equal to $R_{step}$. The calibration circuit determines which voltage $V_1$-$V_8$ along the resistor string most closely approximates reference voltage $V_{ref}$. The priority encoder 1020 uses the comparator outputs to determine which additional components to switch in or out of a critical circuit, or which different components to select for that circuit.

Figure 11C:
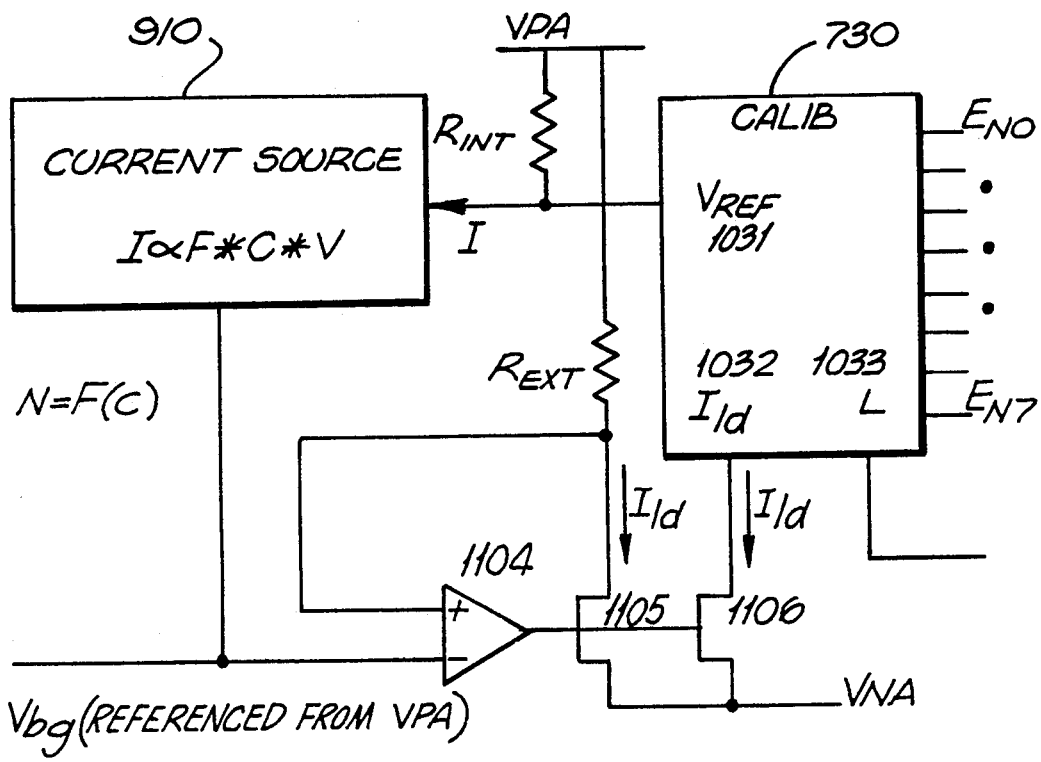
FIGS. 11(A), 11(B) and 11(C) illustrate three block diagrams of trim/compensation circuits using the preferred embodiment.
Figure 11A:
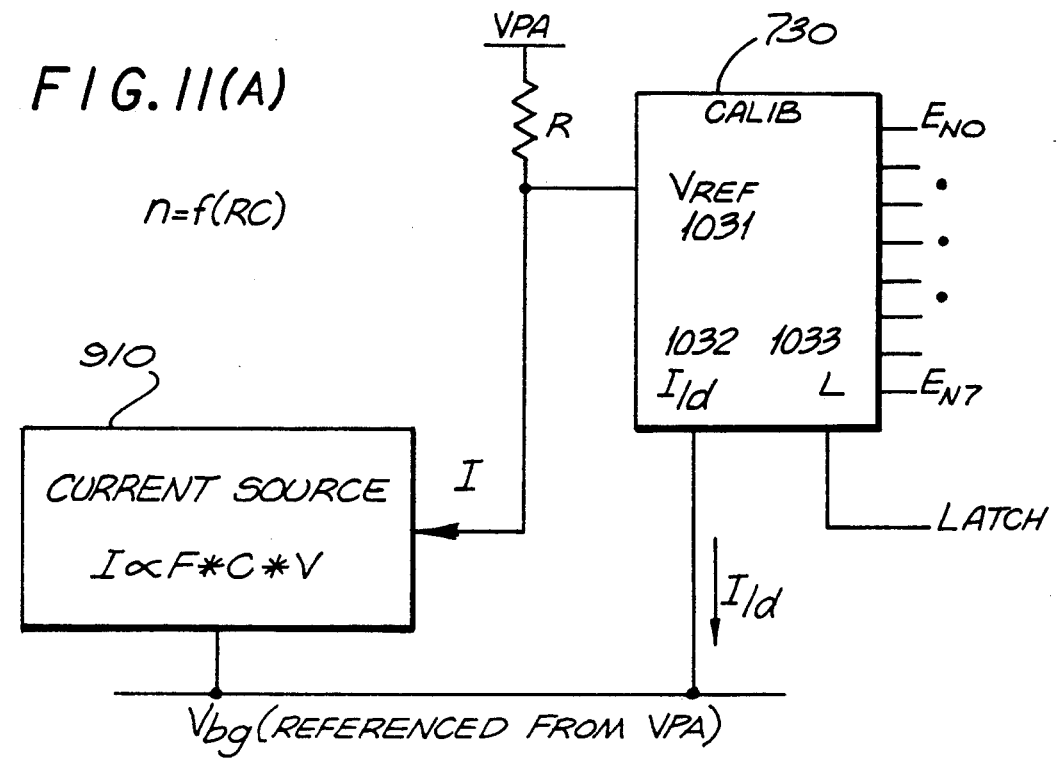

FIG. 11(A) illustrates a trim circuit that compensates for variations in an RC time constant. The first terminal of resistor R is connected to voltage supply VPA, and the second terminal of resistor R is connected to voltage reference input 1031 and to frequency and capacitor based current source 910. Both current source 910 and load current input 1032 are connected to band gap voltage $V_{bg}$, which is referenced from VPA. Input 1033 is connected to an external latching signal.

The current I of current source 910 is equal to $F_{in}*C_i*V_{bg}$. The voltage at reference voltage input 1031 is given by $$V_{ref} = IR = (F_{in}*V_{bg}*C_i)*R$$

For some comparator n along the resistor string of the calibration circuit 730, voltage $V_n$ is approximately equal to $V_{ref}$. Voltage $V_n$ is given by $$V_n = R_n * I_{ld}$$
$$= (n * R_{step}) * (V_{bg}/(N * R_{step}))$$

$$= (n/N) * V_{bg}$$

where N is the total number of resistors in calibration circuit 730's resistor string. (In FIG. 10, N=8). When properly calibrated, $V_n = V_{ref}$, so $$V_n = V_{ref}$$

$$(n/N)*V_{bg} = F_{in}*V_{bg}*C_i*R$$

$$n = N*F_{in}*(RC_i)$$

Thus, n is a function of the time constant $RC_i$. The type of resistor $R_{step}$ used in the resistor string of calibration circuit 730 has no effect on the value of n. The resistor R connected to $V_{ref}$ and the capacitor $C_i$ in current source 910 should both be of the same type as the resistor and capacitor being trimmed. The value of $V_{bg}$ is unimportant. In fact, $V_{bg}$ can be any voltage supply, e.g., an untrimmed uncompensated internal band gap voltage or an external reference. In the extreme case, $V_{bg}$ can be a voltage derived from a resistor voltage divider driven from a power supply. All crucial values and components are based on inexpensive, high-precision sources, such as a crystal based frequency source and external resistors.

Figure 11B:
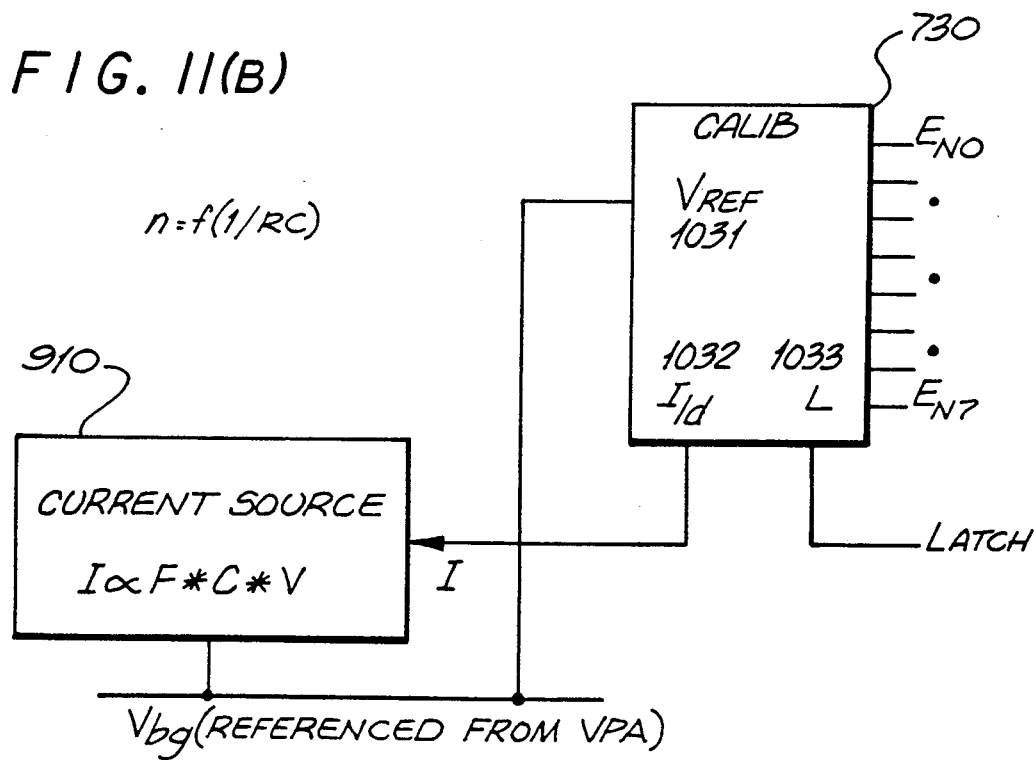

Another example of a trim/compensation scheme using the preferred embodiment is shown in FIG. 11(B). This circuit trims the inverse of the RC time constant. Voltage reference input 1031 is connected to band gap voltage $V_{bg}$ which is referenced from VPA. Input 1032 is connected to frequency and capacitor based current source 910 of the preferred embodiment. Input 1033 is connected to an external latching signal.

The reference voltage at input 1031 is given by $$V_{ref} = V_{bg}$$

For some comparator n in the calibration circuit 730, voltage $V_n$ is approximately equal to $V_{ref}$. Voltage $V_n$ is given by $$V_n = R_n * I_{1d}$$
$$= (n * R_{step}) * (F_{in} * C_i * V_{bg})$$

When properly calibrated, $V_n = V_{ref}$, so $$V_n = V_{ref}$$

$$(n*R_{step})*(F_{in}*C_i*V_{bg}) = V_{bg}$$

$$n = (1/F_{in})*(1/R_{step}C_i)$$

Thus, n is a function of the inverse of time constant $R_{step}C_i$. Once again, the effects of band gap voltage $V_{bg}$ are cancelled out. As before, the type of resistor and capacitor used in the trimming circuit should be the same as the resistor and capacitor being trimmed.

A third example of a trim/compensation scheme using the preferred embodiment is shown in FIG. 11(C). This circuit trims the value of capacitor C. The first terminal of resistor $R_{int}$ is connected to voltage supply VPA, and the second terminal of resistor $R_{int}$ is connected to voltage reference input 1031 and to frequency and capacitor based current source 910. Both current source 910 and the inverting input of operational amplifier 1104 are connected to band gap voltage $V_{bg}$ which is referenced from VPA. The first terminal of resistor $R_{ext}$ is connected to voltage supply VPA, and the second terminal of resistor $R_{ext}$ is connected to the non-inverting input of op-amp 1104 and the drain of NMOS transistor 1105. The output of op-amp 1104 is connected to the gates of NMOS transistors 1105 and 1106. The sources of transistors 1105 and 1106 are connected to another voltage supply VNA. The drain of transistor 1106 is connected to load current input 1032. Input 1033 is connected to an external latching signal.

The voltage at input 1031 is given by $$V_{ref} = IR_{int} = (F_{in}*V_{bg}*C_i)*R_{int}$$

Because transistors 1105 and 1106 form a current mirror, the current $I_{ld}$ flowing through transistor 1106 will approximate the current flowing through transistor 1105. The feedback loop guarantees that this will be given by $$I_{ld} = V_{bg}/R_{ext}$$

For some comparator n in the calibration circuit 730, voltage $V_n$ is approximately equal to $V_{ref}$. Voltage $V_n$ is given by $$V_n = R_n * I_{1d}$$
$$= (n * R_{step}) * (V_{bg}/R_{ext})$$
$$= n * (R_{step}/R_{ext}) * V_{bg}$$

When properly calibrated, $V_n = V_{ref}$, so $$V_n = V_{ref}$$

$$n*(R_{step}/R_{ext})*V_{bg} = F_{in}*V_{bg}*C_i*R_{int}$$

$$n = F_{in}*(R_{int}/R_{step})*R_{ext}*C_i$$

Thus, n is a function of capacitor value C. As before, the effects of band gap voltage $V_{bg}$ are cancelled out. The resistors $R_{int}$ and $R_{step}$ should be of the same type. A low temperature coefficient precision resistor should be used for resistor $R_{ext}$.

The calibration circuit using the preferred embodiment is not limited to the applications illustrated here, but can be applied to a wide range of trimming applications. Compensating for variations in $g_m$, $V_t$ or FET's is possible. Further, the comparators of the calibration circuit 730 may drive priority encoder 1020 directly if they have sufficiently high gain. Priority encoder 1020 may have a binary encoded output instead of the 1 of N output indicated here. The whole circuit may be referenced from anywhere; it is not restricted to voltage supply VPA only, but could have been referenced from voltage supply VNA as well as from some "floating" supply.

The number of comparators in calibration circuit 730 is not limited to eight, nor to any other power of two, but can be any integer value from 2 on up. The resistor string in calibration circuit 730 does not have to be linear, but can use, for example, a geometric step size to minimize to a fixed percentage the quantization error of the calibration circuit.

Thus, a constant current source that may be used in a variety of circuits has been described. Although specific embodiments, materials, designs, components and dimensions have been specified herein, the present invention is not limited to these specific examples. Alternative embodiments encompassing the inventive features of the present invention will be apparent to those skilled in the art, and are intended to be included within the scope of this invention.

I claim:

1. A circuit for providing a constant current comprising:
   charge producing means for receiving an input signal and for providing a first output signal;
   output means coupled to said first output signal, said output means providing said constant current;
   controlling means also coupled to said first output signal, said controlling means for comparing said first output signal to a reference, said controlling means further providing a control signal to said output means, said control signal for controlling the magnitude of said constant current.

2. The circuit of claim 1 wherein said charge producing means comprises an input means.

3. The circuit of claim 2 wherein said charge producing means comprises a first transistor and a second transistor, a first terminal of said first transistor connected to a first voltage supply, a second terminal of said first transistor connected to a second terminal of said second transistor at a first common node, a first terminal of said second transistor connected to a second common node.

4. The circuit of claim 3 wherein said first and second transistors are CMOS transistors.

5. The circuit of claim 4 wherein said first and second transistors are of opposite conductivity types.

6. The circuit of claim 4 wherein said charge producing means further comprises a first capacitor whose first terminal is connected to said first voltage supply and whose second terminal is connected to said first common node.

7. The circuit of claim 6 wherein said charge producing means comprises a third transistor and a fourth transistor, a first terminal of said third transistor connected to said first voltage supply, a second terminal of said third transistor connected to a second terminal of said fourth transistor at a third common node, a first terminal of said fourth transistor connected to said second common node.

8. The circuit of claim 7 wherein said third and fourth transistors are CMOS transistors.

9. The circuit of claim 8 wherein said third and fourth transistors are of opposite conductivity types.

10. The circuit of claim 9 wherein said first and third transistors are of the same conductivity type.

11. The circuit of claim 7 wherein said charge producing means further comprises a second capacitor whose first terminal is connected to said first voltage supply and whose second terminal is connected to said third common node.

12. The circuit of claim 11 comprising an impedance element whose first terminal is connected to said first voltage supply and whose second terminal is connected to said second common node.

13. The circuit of claim 12 wherein said impedance element is a third capacitor.

14. The circuit of claim 12 wherein said impedance element is a Miller capacitor.

15. The circuit of claim 12 wherein said input signal is an oscillating signal.

16. The circuit of claim 15 wherein said input means receives said input signal and produces a second and third output signal, said second and third output signals having periods equal to a multiple of the period of the input signal.

17. The circuit of claim 16 wherein said second and third output signal are complementary.

18. The circuit of claim 17 wherein said second output signal is coupled to the third terminals of said first and second transistors.

19. The circuit of claim 18 wherein said third output signal is coupled to the third terminals of said third and fourth transistors.

20. The circuit of claim 16 wherein said multiple is equal to two.

21. The circuit of claim 16 wherein said first output signal is generated at said second common node.

22. The circuit of claim 1 wherein said controlling means comprises an operational amplifier.

23. The circuit of claim 22 wherein said first output signal is coupled to the non-inverting input of said operational amplifier, and said reference is coupled to the inverting input of said operational amplifier.

24. The circuit of claim 22 wherein said first output signal is coupled to the inverting input of said operational amplifier, and said reference is coupled to the non-inverting input of said operational amplifier.

25. The circuit of claim 23 wherein said control signal is the output from said operational amplifier.

26. The circuit of claim 1 wherein said controlling means comprises a comparator.

27. The circuit of claim 1 wherein said output means comprises a current mirror.

28. The circuit of claim 27 wherein said current mirror comprises a fifth and sixth transistor.

29. The circuit of claim 28 wherein said fifth and sixth transistors are of the same conductivity type.

30. The circuit of claim 29 wherein said fifth and sixth transistors are CMOS transistors.

31. The circuit of claim 29 wherein said fifth and sixth transistors are bipolar transistors.

32. The circuit of claim 29 wherein the first terminal of said fifth transistor is coupled to said first output signal, the first terminal of said sixth transistor provides said constant current, and the second terminals of said fifth and sixth transistors are coupled to a second voltage supply.

33. The circuit of claim 32 wherein said control signal is coupled to the third terminal of said fifth and sixth transistors.

34. The circuit of claim 32 wherein said control signal is coupled to the third terminal of said fifth transistor and to the first terminal of a low pass filter, the second terminal of said low pass filter coupled to the third terminal of said sixth transistor.

35. The circuit of claim 34 wherein said low pass filter comprises a first resistor and a fourth capacitor, the first terminal of said resistor coupled to the third terminal of said fifth transistor and to said control signal, said second terminal of said resistor coupled to said third terminal of said sixth transistor and to the first terminal of said fourth capacitor, the second terminal of said fourth capacitor coupled to said second voltage supply.

36. The circuit of claim 2 where said input means comprises a type D flip-flop.

37. A circuit for providing a constant current comprising:
   input means for receiving an input signal and for providing a plurality of first output signals;
   a plurality of capacitor switches for receiving said plurality of first output signals, said plurality of capacitor switches providing a second output signal;

output means coupled to said second output signal, said output means providing said constant current;

controlling means coupled to said second output signal, said controlling means for comparing said second output signal to a reference voltage, said controlling means further providing a control signal to said output means, said control signal for controlling the magnitude of said constant current.

38. The circuit of claim 37 wherein each of said capacitor switches comprises a first transistor and a second transistor of opposite conductivity types, a first terminal of said first transistor connected to a first voltage supply, a second terminal of said first transistor connected to a second terminal of said second transistor at a first common node, a first terminal of said second transistor connected to a second common node.

39. The circuit of claim 38 wherein each of said capacitor switches further comprises a first capacitor whose first terminal is connected to said first voltage supply and whose second terminal is connected to said first common node.

40. The circuit of claim 39 that further comprises an impedance element whose first terminal is connected to said first voltage supply and whose second terminal is connected to said second common node.

41. The circuit of claim 40 wherein each of said plurality of first output signals have periods equal to a multiple of the period of the input signal, said multiple equal to the number of said plurality of capacitor switches.

42. The circuit of claim 41 wherein each of said plurality of first output signals is coupled to the third terminals of each of said first and second transistors of each of said capacitor switches.

43. A circuit for introducing a time delay into a first input signal comprising:
first and second transistors coupled to said first input signal;
first capacitor coupled to said first and second transistors, a first voltage supply, and a comparator, said first voltage supply also coupled to said comparator;
a constant current source coupled to said second transistor and a frequency signal, said constant current source generating a constant current whose magnitude is proportional to the magnitudes of said frequency signal, a reference voltage, and a second capacitor.

44. The circuit of claim 43 wherein said constant current source comprises:
input means for receiving a second input signal and for providing a plurality of first output signals;
a plurality of capacitor switches for receiving said plurality of first output signals, said plurality of capacitor switches providing a second output signal;
output means coupled to said second output signal, said output means providing said constant current;
controlling means coupled to said second output signal, said controlling means for comparing said second output signal to said reference voltage, said controlling means further providing a control signal to said output means, said control signal for controlling the magnitude of said constant current.

45. A trim/compensation circuit comprising:
a calibration circuit, said calibration circuit having a voltage input terminal, a current input terminal, and a plurality of output terminals;
a constant current source coupled to a frequency signal and to one input terminal of said calibration circuit, said constant current source generating a constant current whose magnitude is proportional to the magnitudes of said frequency signal, a reference voltage, and a capacitor.

46. The circuit of claim 45 wherein said constant current source comprises:
input means for receiving an input signal and for providing a plurality of first output signals;
a plurality of capacitor switches for receiving said plurality of first output signals, said plurality of capacitor switches providing a second output signal;
output means coupled to said second output signal, said output means providing said constant current;
controlling means coupled to said second output signal, said controlling means for comparing said second output signal to said reference voltage, said controlling means further providing a control signal to said output means, said control signal for controlling the magnitude of said constant current.

47. The circuit of claim 46 wherein:
said voltage input terminal is coupled to said constant current of said constant current source and through a resistor to a first voltage supply;
said current input terminal is coupled to said reference voltage.

48. The circuit of 46 wherein:
said voltage input terminal is coupled to said reference voltage;
said current input terminal is coupled to said constant current of said constant current source.

49. The circuit of claim 46 wherein:
said voltage input terminal is coupled to said constant current of said constant current source and through a first resistor to a first voltage supply;
said current input terminal is coupled to a comparator circuit, said comparator circuit comprising:
first transistor coupled to said current input terminal, a second voltage supply, and an output of a comparator;
second transistor coupled to said first transistor, said second voltage supply, said output and non-inverting input of said comparator, and through a second resistor to said first voltage supply;
said inverting input of said comparator coupled to said reference voltage.

* * * * *